United States Patent [19]
Hotta

[11] Patent Number: 5,650,710
[45] Date of Patent: Jul. 22, 1997

[54] APPARATUS FOR CONTROLLING A CHARGING START TIME AND CHARGING PERIOD FOR A STORAGE BATTERY IN AN ELECTRIC VEHICLE TO COMPLETE CHARGING AT A SCHEDULED BOARDING TIME

[75] Inventor: Yoshihiko Hotta, Wako, Japan

[73] Assignee: Honda Giken Kogyo Kabushiki Kaisha, Tokyo, Japan

[21] Appl. No.: 476,072

[22] Filed: Jun. 7, 1995

[30] Foreign Application Priority Data

Feb. 6, 1995 [JP] Japan .................................. 7-018260

[51] Int. Cl.$^6$ ............................................. H01M 10/46
[52] U.S. Cl. .................................. 320/11; 320/31; 320/48
[58] Field of Search .............................. 320/21, 30, 31, 320/34, 48, 11; 180/65.1; 340/636; 324/427; 429/90

[56] References Cited

U.S. PATENT DOCUMENTS 5,305,613  4/1994  Hotta et al. .......................... 180/65.1

*Primary Examiner*—Peter S. Wong
*Assistant Examiner*—E. Tso
*Attorney, Agent, or Firm*—Lyon & Lyon LLP

[57] ABSTRACT

An apparatus controls a charger for starting and stopping the charging of a storage battery of an electric vehicle at advantageous times based on relevant parameters. A necessary charging period is calculated on the basis of the amount of electric energy that is discharged from the storage battery at the time the charging of the storage battery is commanded by a charging start command key switch, and also on the basis of a predetermined charging current. A charging start time to finish the charging of the storage battery at a scheduled boarding time is calculated by a charging start time calculating circuit based on the calculated necessary charging period and the scheduled boarding time which is set by the driver by a scheduled boarding time setting key switch. The storage battery starts being charged with the predetermined charging current from the calculated charging start time. Therefore, the storage battery is prevented from being self-discharged when left to stand for a long period of time after it has been charged until the driver enters the electric vehicle, and any reduction in the temperature of the storage battery is minimized.

15 Claims, 20 Drawing Sheets

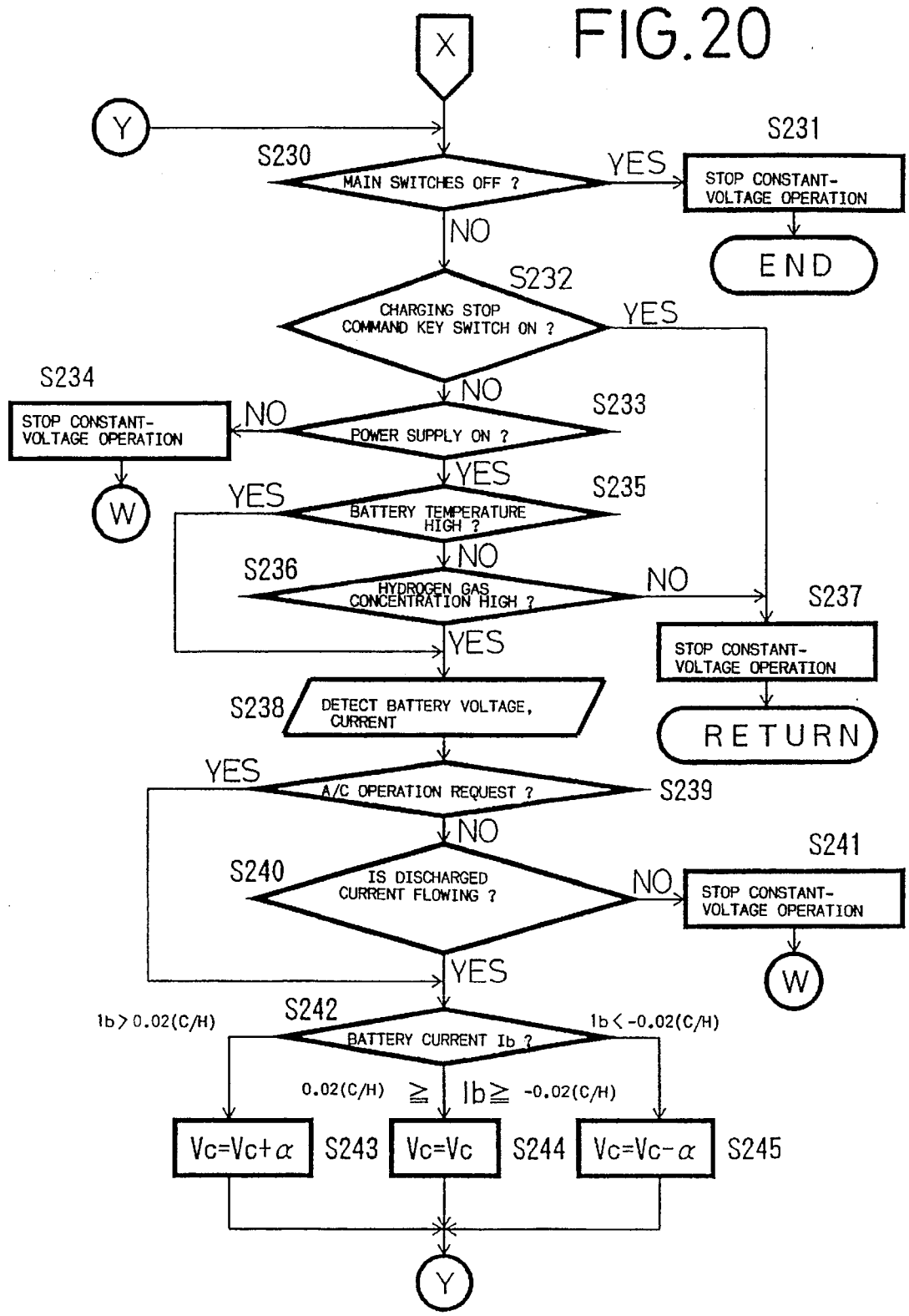

APPARATUS FOR CONTROLLING A CHARGING START TIME AND CHARGING PERIOD FOR A STORAGE BATTERY IN AN ELECTRIC VEHICLE TO COMPLETE CHARGING AT A SCHEDULED BOARDING TIME

BACKGROUND OF THE INVENTION

1. Field of the Invention

The present invention relates to an apparatus for controlling the charging of a storage battery for use as a drive energy source on an electric vehicle, and more particularly to such a storage battery charging control apparatus capable of finishing the charging of a storage battery at a scheduled time for boarding the vehicle.

2. Description of the Related Art

Chargers for charging storage batteries for use on electric vehicles generally have a charging start command key for starting to charge the storage battery and a charging stop command key for stopping charging the storage battery. The storage battery starts being charged when the charging start command key is manually pressed, and the charging of the storage battery is stopped when the charging stop command key is manually pressed.

It has been proposed to charge storage batteries for use on electric vehicles with electric energy that is available from a commercial electric energy supply system at a discount night rate. For charging the storage batteries with electric energy available at the night rate, it has also been proposed to employ a timer which allows the charging electric energy to be supplied only in a night time zone in which the electric energy is available at the discount night rate.

When the storage battery on an electric vehicle is to be charged at home or in a business facility, it is often customary to connect a charger to a power supply outlet to start charging the storage battery at the same time that the electric vehicle is parked because it is time-consuming to charge the storage battery.

If the storage battery is charged prior to a day on which the electric vehicle is not used, e.g., on a weekend, then the storage battery is left to stand for a long period of time from the end of the charging process to the start of driving of the electric vehicle, and the charged storage battery tends to be self-discharged during that period of time.

Another problem is that while the temperature of the storage battery is high immediately after it is charged, the temperature of the storage battery drops soon in a cold climate after having been left to stand for a long period of time, thereby adversely effecting the discharging characteristics of the storage battery and resulting in a virtual reduction in the storage capacity of the storage battery. This problem manifests itself with general lead storage batteries.

Users of electric vehicles tend to start charging the storage batteries on the electric vehicles at the end of work in the evening or after going home. This charging practice poses a problem because it increases demands for electric energy and hence produces a peak of demands for electric energy in that time zone.

SUMMARY OF THE INVENTION

It is an object of the present invention to provide an apparatus for controlling the charging of a storage battery for use on an electric vehicle so as to prevent the storage battery from being self-discharged when left to stand for a long period of time after it has been charged until the user enters the electric vehicle, and so as to minimize a reduction in the temperature of the storage battery.

To achieve the above object, there is provided in accordance with the present invention an apparatus for controlling a charger for charging a storage battery for use on an electric vehicle, comprising scheduled boarding time indicating means for indicating a scheduled time for boarding and using the vehicle (boarding time), charging commanding means for commanding charging of the storage battery, charging period calculating means for calculating a necessary charging period based on an amount of electric energy discharged from the storage battery when charging of the storage battery is commanded and a predetermined charging current, and charging start time calculating means for calculating a charging start time to finish the charging of the storage battery at the indicated scheduled boarding time based on the indicated scheduled boarding time and the calculated necessary charging period, the arrangement being such that the storage battery starts being charged with the predetermined charging current from the calculated charging start time.

With the above arrangement, a necessary charging period is calculated based on the amount of electric energy discharged from the storage battery when charging of the storage battery is commanded and the predetermined charging current, and a charging start time to finish the charging of the storage battery at the indicated scheduled boarding time is calculated based on the indicated scheduled boarding time and the calculated necessary charging period, and the storage battery starts being charged with the predetermined charging current from the calculated charging start time.

To achieve the above object, there is also provided in accordance with the present invention an apparatus for controlling a charger for charging a storage battery for use on an electric vehicle, comprising scheduled boarding time indicating means for indicating a scheduled boarding time, charging commanding means for commanding charging of the storage battery, memory means for storing a charging period based on an amount of electric energy discharged from the storage battery and a voltage of a power supply supplied to the charger, charging period calculating means for calculating a necessary charging period based on a charging period read from the memory means by referring to the amount of electric energy discharged from the storage battery and the voltage of the power supply supplied to the charger, and charging start time calculating means for calculating a charging start time to finish the charging of the storage battery at the indicated scheduled boarding time based on the indicated scheduled boarding time and the calculated necessary charging period, the arrangement being such that the storage battery starts being charged with a predetermined charging current based on the voltage of the power supply from the calculated charging start time.

With the above arrangement, a necessary charging period based on a charging period read from the memory means by referring to the amount of electric energy discharged from the storage battery and the voltage of the power supply supplied to the charger at the time the charging of the storage battery is commanded, and a charging start time to finish the charging of the storage battery at the indicated scheduled boarding time is calculated based on the indicated scheduled boarding time and the calculated necessary charging period, and the storage battery starts being charged with the predetermined charging current from the calculated charging start time.

BRIEF DESCRIPTION OF THE DRAWINGS

FIGS. 19 and 20 are flowcharts of a subroutine of a sequence for a charge holding mode "b" in the operation of the apparatus shown in FIG. 1.

DETAILED DESCRIPTION OF THE PREFERRED EMBODIMENT

Figure 1:
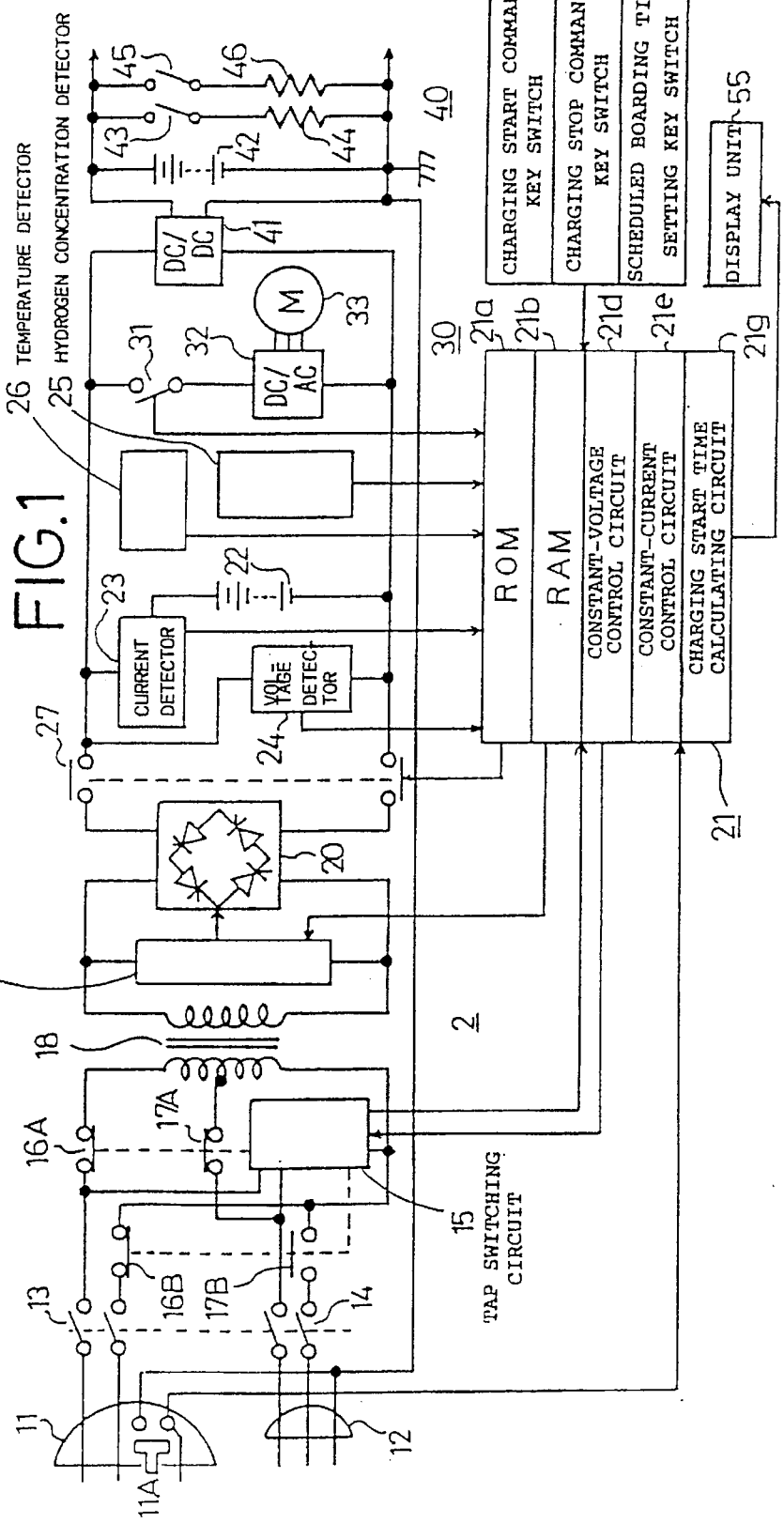
FIG. 1 is a block diagram of an apparatus for controlling the charging of a storage battery for use on an electric vehicle according to the present invention.

FIG. 1 shows in block form an apparatus for controlling the charging of a storage battery for use on an electric vehicle according to the present invention.

As shown in FIG. 1, the apparatus includes a charger 2 for charging a storage battery 22 for use on an electric vehicle. In reality, the charger 2 and the storage battery 22 are installed on the electric vehicle.

The charger 2 has a power supply plug 11 with a plug connection detecting switch 11A and a power supply plug 12. The voltage of a 200-V power supply that is supplied through the power supply plug 11 is applied through a main switch 13 and contactors 16A, 16B to the opposite terminals of a primary winding of a transformer 18 which serves to change the voltage and isolate circuits. The voltage of a 100-V power supply that is supplied through the power supply plug 12 is applied through a main switch 14 and contactors 17A, 17B to a center tap of the transformer 18 and one of the opposite terminals of the primary winding thereof.

The charger 2 also has a tap switching circuit 15 which is supplied with the power supply voltages through the main switches 13, 14, sends information representative of the supplied power supply voltages to a controller 21, and turns on only one of the contactors 16A, 16B and only one of the contactors 17A, 17B based on a signal from the controller 21. The main switches 13, 14 are ganged with each other.

When the main switches 13, 14 are turned on and only the power supply plug 11 is inserted into a power supply outlet, the tap switching circuit 15 determines that only the voltage of 200 V is supplied, and is controlled by the controller 21 to turn on the contactors 16A, 16B and turn off the contactors 17A, 17B for thereby applying the voltage of 200 V across the primary winding of the transformer 18.

When the main switches 13, 14 are turned on and only the power supply plug 12 is inserted into a power supply outlet, the tap switching circuit 15 determines that only the voltage of 100 V is supplied, and is controlled by the controller 21 to turn on the contactors 17A, 17B and turn off the contactors 16A, 16B for thereby applying the voltage of 100 V between one of the terminals of the primary winding of the transformer 18 and the center tap of the primary winding thereof.

When the main switches 13, 14 are turned on and both the power supply plugs 11, 12 are inserted into respective power supply outlets, the tap switching circuit 15 determines that both the voltages of 100 V and 200 V are supplied, and is controlled by the controller 21 to turn on either the contactors 17A, 17B or the contactors 16A, 16B and turn off the other contactors for thereby applying the voltage of 100 V between one of the terminals of the primary winding of the transformer 18 and the center tap of the primary winding thereof or the voltage of 200 V across the primary winding of the transformer 18.

The transformer 18 induces the same voltage across its secondary winding when the voltage of 200 V is applied across the primary winding of the transformer 18 or the voltage of 100 V is applied between one of the terminals of the primary winding of the transformer 18 and the center tap of the primary winding. The voltage induced across the secondary winding of the transformer 18 is applied to a phase control circuit 19 and a thyristor bridge 20 whose output is controlled by the phase control circuit 19. The transformer 18 isolates the phase control circuit 19, the thyristor bridge 20, and other circuits connected thereto from the power supply plugs 11, 12, the main switches 13, 14, the contactors 16A, 16B, 17A, 17A, and the tap switching circuit 15.

The power supply plug 12 has a ground plug that is connected to a ground terminal on the vehicle body of the electric vehicle. The power supply plug 11 preferably is of such a structure which allows itself to be inserted into only a power supply outlet that is supplied with the voltage of a power supply available at a night rate. When the power supply plug 11 is inserted into the power supply outlet, it is supplied with voltage of a power supply available at night. The plug connection detecting switch 11A of the power supply plug 11 has a terminal connected to the ground terminal on the vehicle body, and another terminal connected to the controller 21 for detecting a plug connection.

The phase control circuit 19 is controlled by an output signal from the controller 21 to control the phase to turn on the thyristors of the thyristor bridge 20 for thereby controlling an output current and voltage from the thyristor bridge 20. In this embodiment, the phase control circuit 19 controls the thyristor bridge 20 to output a constant current or a constant voltage.

The electric vehicle has a current detector 23 for detecting a charging current flowing to and a discharged current flowing from the storage battery 22, a voltage detector 24 for detecting a voltage across the storage battery 22, a hydrogen concentration detector 25 for detecting the concentration of a hydrogen gas generated from the electrolyte of the storage battery 22, a temperature detector 26 for detecting the temperature of the electrolyte of the storage battery 22, a contactor 27 for turning on and off a charging voltage supplied from the thyristor bridge 20, an air-conditioning unit (hereinafter referred to as A/C) 30 energizable by an output voltage from the storage battery 22 for air-conditioning the passenger compartment of the electric vehicle, and accessories 40 energizable by the output voltage from the storage battery 22.

The air-conditioning unit 30 has a switch 31, a DC/AC converter 32 for converting a direct current supplied through the switch 31 into an alternating current, and a compressor-driving motor 33 energizable by the alternating current from the DC/AC converter 32 for driving the compressor of the air-conditioning unit 30. An ON/OFF output signal from the switch 31 is supplied to the controller 21 to permit the controller 21 to detect when the air-conditioning unit 30 is actuated.

The accessories 40 include a DC/DC converter 41 for converting the voltage of the storage battery 22 into a DC voltage of 12 V, for example, an electric component 44 such as a lamp or the like which is energizable by the output voltage supplied from the DC/DC converter 41 through a switch 43, and a heating wire 46 embedded in a window panel and energizable by the output voltage supplied from the DC/DC converter 41 through a switch 45 for defrosting the window panel. In this embodiment, the output DC voltage from the DC/DC converter 41 preferably is set to 12 V in conformity with the voltage used to energize the accessories 40 that are presently available in the market.

The controller 21 comprises a microcomputer for controlling the tap switching circuit 15 to turn on and off the contactors 16A, 16B, 17A, 17B, controlling the phase control circuit 19 to control the phase of the thyristor bridge 20, turning on and off the contactor 27, and controlling a display unit 55 to display necessary information, in response to an output signal from the plug connection detecting switch 11A, an output signal from the tap switching circuit 15, a detected output signal from the current detector 23, a detected output signal from the voltage detector 24, a detected output signal from the hydrogen concentration detector 25, a detected output signal from the temperature detector 26, an ON/OFF output signal from the switch 31, an output signal from a charging start command key switch 51, an output signal from a charging stop command key switch 52, and an output signal from a scheduled boarding time setting key switch 53.

The controller 21 also has a ROM 21a which stores a program for controlling the microcomputer, and a RAM 21b having a working area for storing arithmetic data and an area for storing results of arithmetic operations.

The controller 21 functionally has a constant-voltage control circuit 21d for controlling the phase control circuit 19 to regulate the output voltage of the thyristor bridge 20 into a target constant voltage, a constant-current control circuit 21e for controlling the phase control circuit 19 to regulate the output current of the thyristor bridge 20 into a target constant current, and a charging start time calculating circuit 21g. The controller 21 turns on and off the contactor 27 based on a charging start command and a charging stop command, and detects whether the air-conditioning unit 30 operates or not based on an ON/OFF signal from the switch 31.

Operation of the apparatus according to the present invention will be described below with reference to flowcharts shown in FIGS. 2 through 20.

The constant-voltage control circuit 21d functionally has an energization control circuit for energizing the air-conditioning unit 30 and the accessories 40 with the charger 2 when the air-conditioning unit 30 and the accessories 40 are to be energized during a period before the storage battery 22 starts to be charged and during a period after the charging of the storage battery 22 is finished and until the charger 2 is de-energized.

Figure 2:
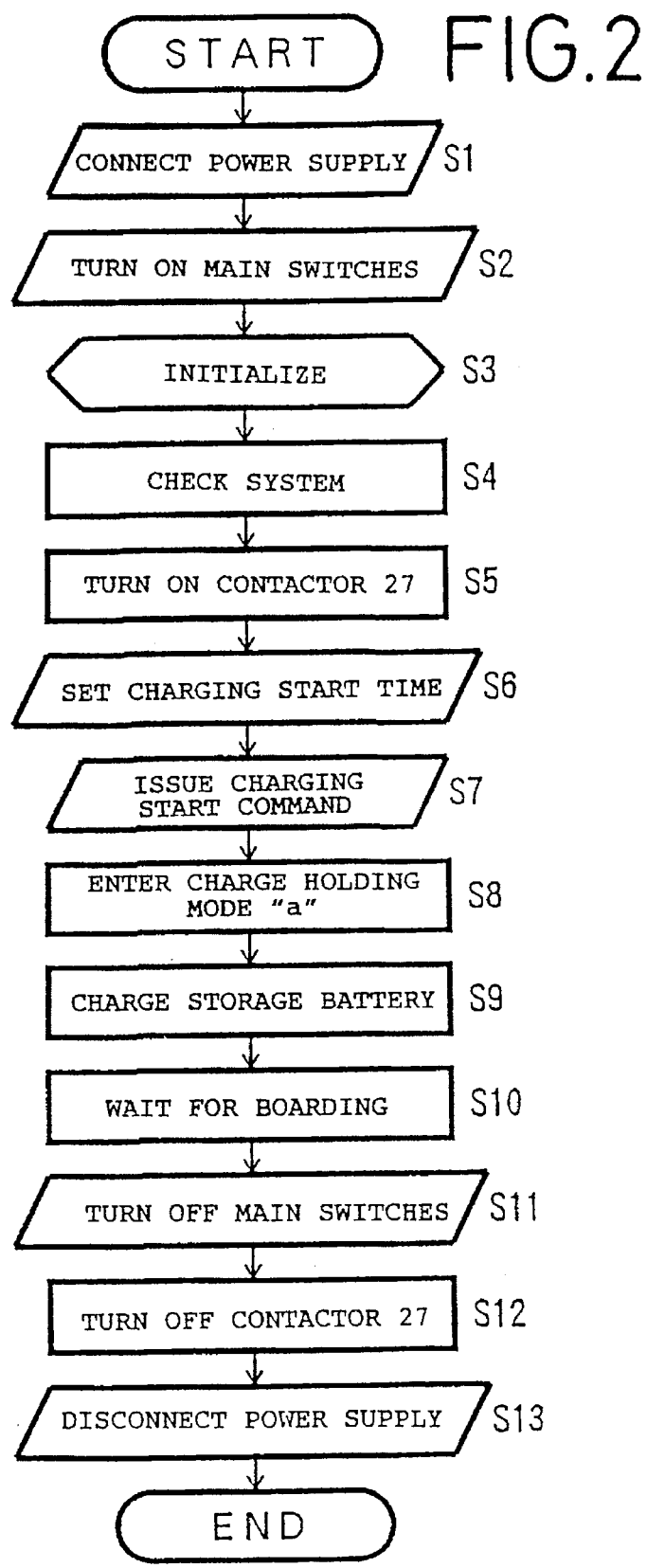
FIG. 2 is a flowchart of a main routine of operation of the apparatus shown in FIG. 1.

A main routine of the operation of the apparatus will be described below with reference to FIG. 2.

Power supplies are connected to the apparatus in a step S1 when the power supply plug 11 and/or the power supply plug 12 is inserted into the power supply outlet before the storage battery 22 is charged. Then, the main switches 13, 14 are turned on in a step S2. The turning-on and -off of the main switches 13, 14 is detected by the controller 21. The voltage of the power supply connected in the step S1 is detected by the tap switching circuit 15, and a detected output signal from the tap switching circuit 15 is supplied to the controller 21 which determines the power supply voltage supplied to the charger 2. Depending on the determined power supply voltage, the controller 21 turns on the contactors 16A, 16A or the contactors 17A, 17B. Although not shown, the controller 21 is backed up by the output voltage from an accessory battery 42 on the electric vehicle.

After the step S2, the controller 21 is initialized by a command from the charging start command key switch 51 in a step S3. Then, the controller 21 effects a system check in a step S4, for example, by determining whether the current detector 23, the voltage detector 24, the hydrogen concentration detector 25, and the temperature detector 26 are normal or not.

The system check in step S4 is followed by a step S5 in which the controller 21 turns on the contactor 27. Then, the controller 21 executes, in a step S6, a subroutine of a sequence for setting a charging start time based on a scheduled boarding time (the time that the driver intends to next board and drive the electric vehicle) that is set by the scheduled boarding time setting key switch 53. The controller 21 issues a charging start command by turning on the charging start command key switch 51 in a step S7. Based on the charging start command, the apparatus enters and stays in a charge holding mode "a" in a step S8 until a calculated charging start time in order to finish the charging of the storage battery 22 at the scheduled boarding time. The charge holding mode "a" is a subroutine mode in which a load is energized by the charger 2 if the load is actuated before the storage battery 2 starts being charged.

The charge holding mode "a" is ended when the charging start time is reached in the charge holding mode "a", and the apparatus starts charging the storage battery 22 in a step S9. In the step S9, the storage battery 22 may be charged in a two-stage charging mode, i.e., a constant-current/constant-current charging mode, or another two-stage charging mode, i.e., a constant-current/constant-voltage charging mode. One of these two-stage charging modes is selected in the initializing step depending on the type of the storage battery 22.

After the charging of the storage battery 22 is finished in the step S9, a subroutine of a sequence for boarding waiting is carried out in a step S10. The sequence for boarding waiting is a sequence in which a load is supplied with electric energy from the charger 2 if the load is actuated after the charging of the storage battery 22 is finished and until the charger 2 is de-energized. If the main switches 13, 14 are turned off in the sequence for boarding waiting, then the energization of the charger 2 is finished, and the charging of the storage battery 22 is ended in a step S11, then the contactor 27 is turned off in a step S12, and thereafter the inserted power supply plugs 11, 12 are pulled out in a step S13.

Figure 3:
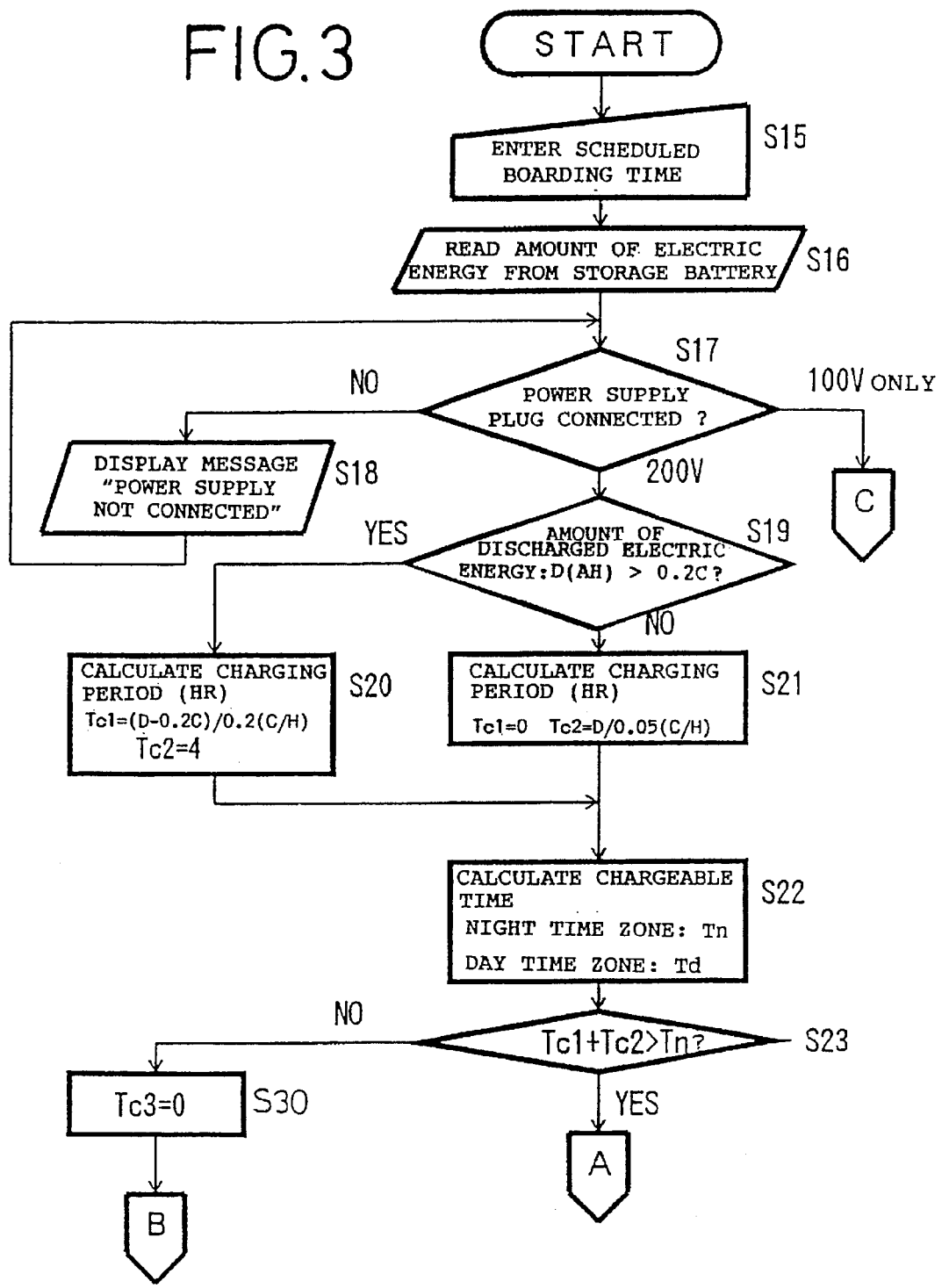
FIGS. 3 and 4 are flowcharts of a subroutine of a sequence for setting a charging start time in the operation of the apparatus shown in FIG. 1.
Figure 4:
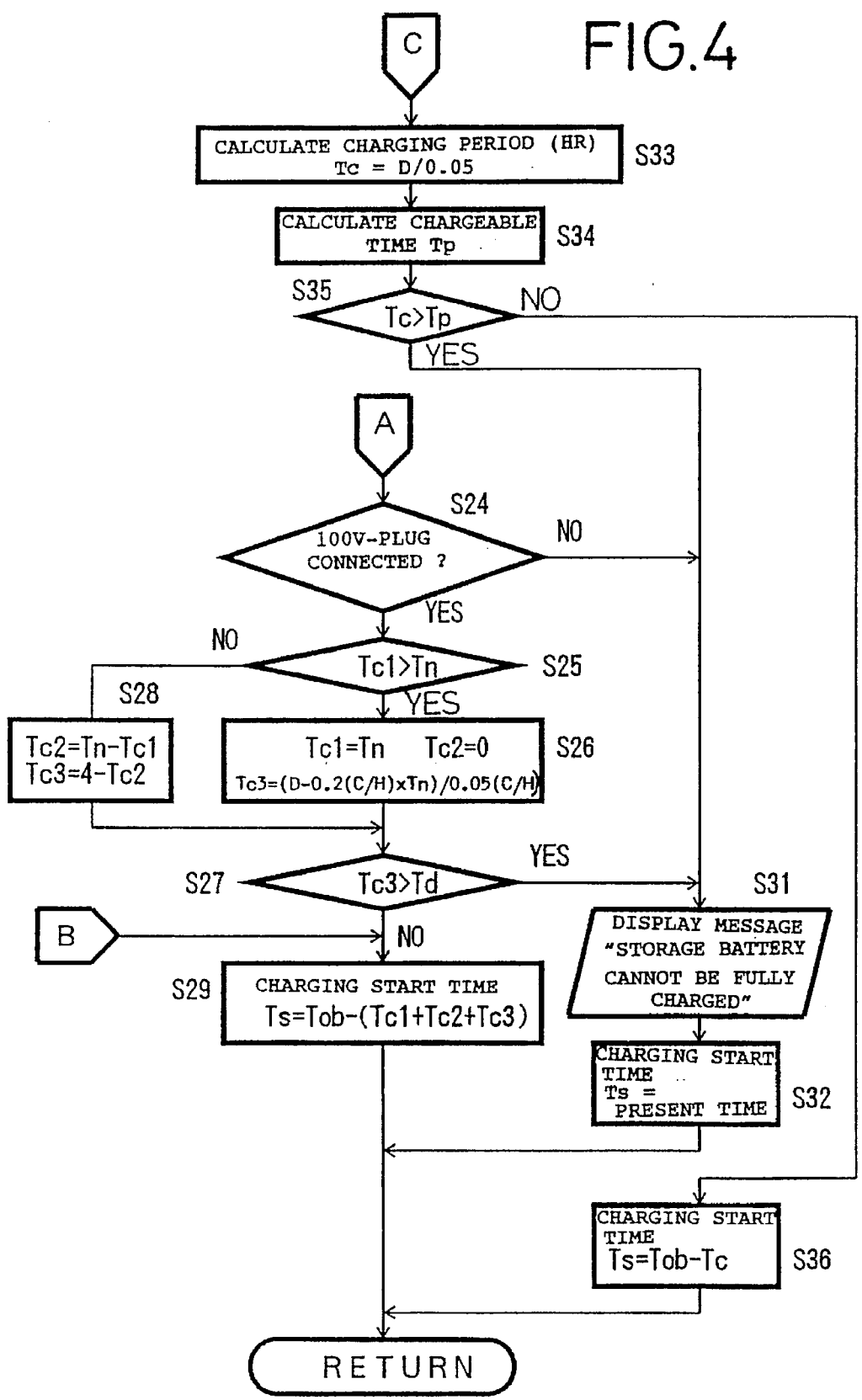
Figure 5:
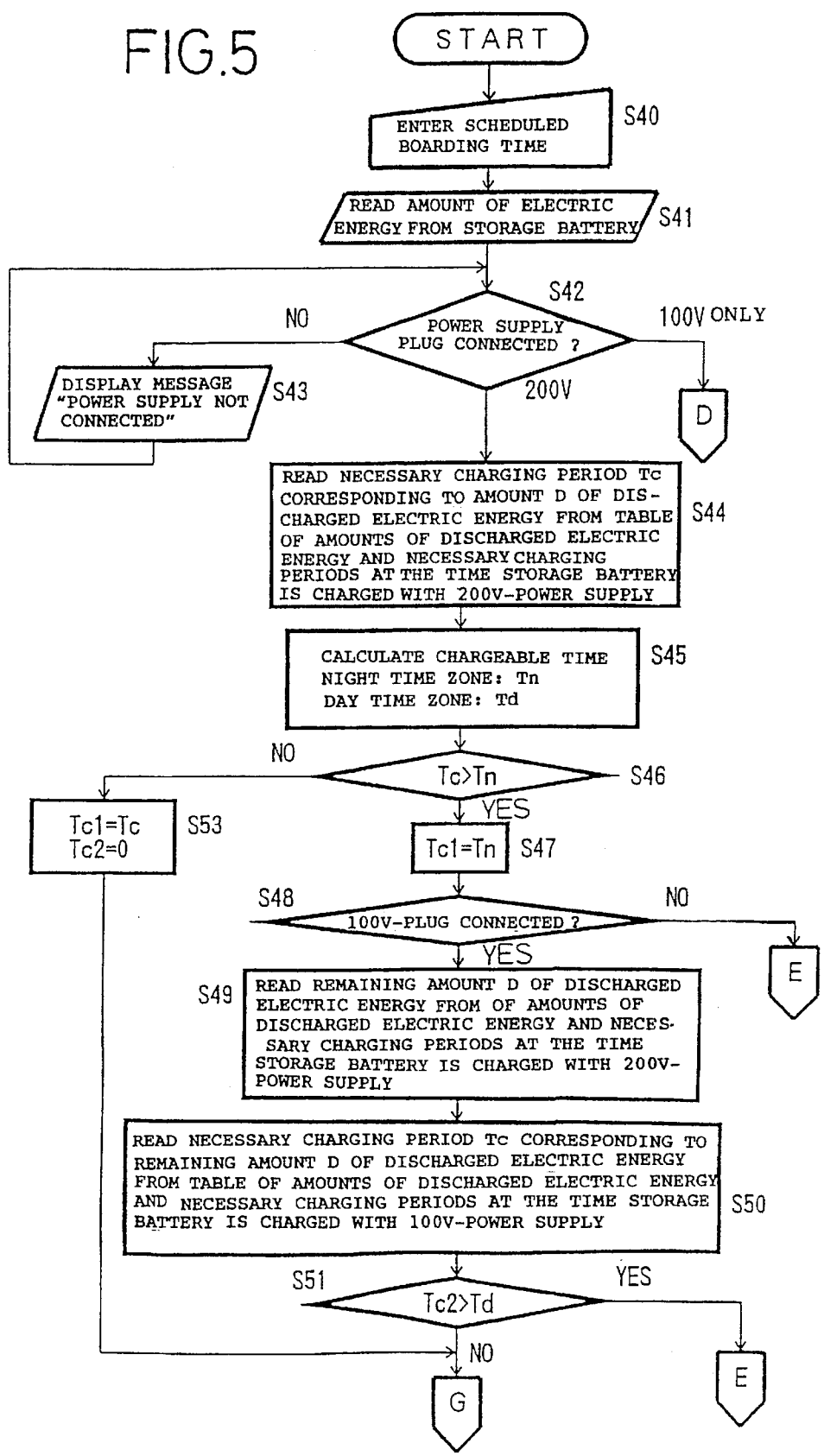
FIGS. 5 and 6 are flowcharts of another subroutine of the sequence for setting a charging start time in the operation of the apparatus shown in FIG. 1.
Figure 6:
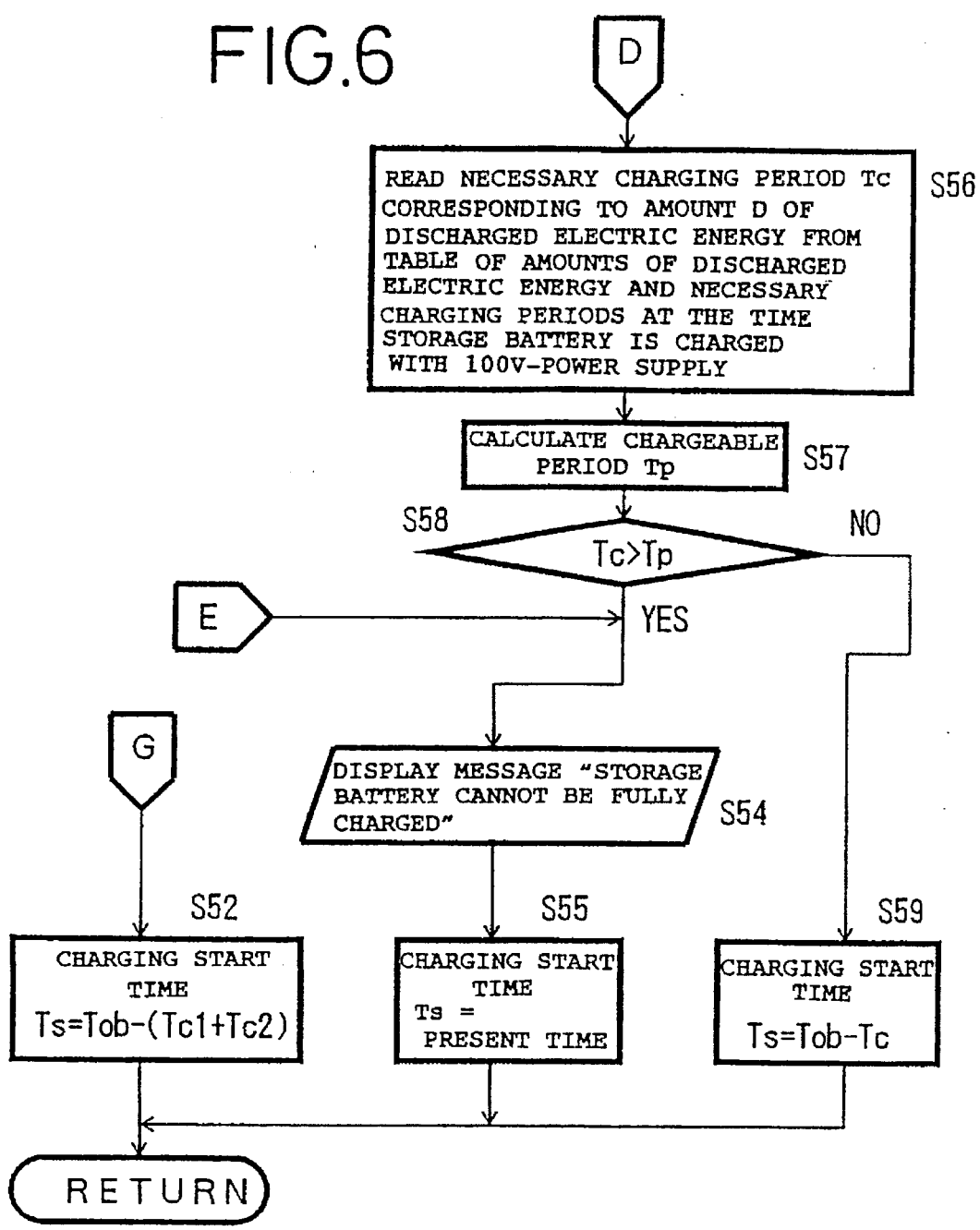

Subroutines of sequences for setting a charging start time in the step S6 will be described below with reference to FIGS. 3 through 6. FIGS. 3 and 4 show a subroutine of a sequence for setting a charging start time in the constant-current/constant-current charging mode, and FIGS. 5 and 6 show a subroutine of a sequence for setting a charging start time in the constant-current/constant-voltage charging mode.

First, the subroutine of the sequence for setting a charging start time in the constant-current/constant-current charging mode will be described below with reference to FIGS. 3 and 4.

A scheduled boarding time Tob is established by the scheduled boarding time setting key switch 53, and is read and stored in the RAM 21b in a step S15. The amount of electric energy discharged from the storage battery 22, which has been integrated and stored, is also read and stored in the RAM 21b in a step S16.

The step S16 is followed by a step S17 which determines if a power supply plug is inserted in a power supply outlet, based on an output signal from the tap switching circuit 15 and an output signal from the plug connection detecting switch 11A. If both the power supply plugs 11, 12 are not inserted in the respective power supply outlets, then a message indicating that no power supply is connected is displayed on the display unit 55 in a step S18, and the controller 21 waits for a power supply plug to be inserted in a power supply outlet.

If it is determined that the power supply plug 11 is inserted in the corresponding power supply outlet in the step S17, then the controller 21 determines whether the amount of discharged electric energy D(AH) is D(AH)>0.2C or not in a step S19, where C is the storage capacity of the storage battery 22 indicated by AH (ampere-hour).

If D(AH)>0.2C in the step S19, then it indicates that the amount of discharged electric energy exceeds 0.2C, and the controller 21 calculates necessary charging periods according to Tc1=(D−0.2C)/0.2(C/H) and Tc2=4 hours in a step S20, where Tc1 is a charging period in hours (H) necessary to charge a portion of the amount of discharged electric energy beyond 0.2C, with a current of 0.2(C/H), and Tc2 is a charging period necessary to charge the remaining amount of discharged electric energy of 0.2C with a current of 0.05(C/H). In this example, the current in the first stage of the two-stage charging mode is 0.2(C/H) and the current in the second stage of the two-stage charging mode is 0.05(C/H). However, desired charging currents may be selected in a charging mode composed of a greater number of stages and different time periods.

If D(AH) is not greater than 0.2C in the step S19, then it indicates that the amount of discharged electric energy is equal to or less than 0.2C, and the controller 21 calculates necessary charging periods according to Tc1=0 and Tc2=D/0.05(C/H) in a step S21. In this case, inasmuch as the amount of discharged electric energy is so small that discharged electric energy does not exceed 0.2C, the necessary charging period Tc1 is set to "0", and the necessary charging period Tc2 is a charging period required to charge the amount of discharged electric energy equal to or less than 0.2C with a current of 0.05(C/H).

After the steps S20, S21, the controller 21 calculates a chargeable period up to the scheduled boarding time in a step S22. The chargeable period is calculated as a period (=Tn) in a night time zone in which the electric power supply is available at a night rate and a period (=Td) in a day time zone in which the electric power supply is available at a day rate, with reference to a period from the present time to the scheduled boarding time. The chargeable period is calculated on the basis of the scheduled boarding time and the present time. The night time zone is assumed to be a time of less consumption in the electric power by the general public in view of supplying the power and the electric voltage would be about 200 V. For example, if the present time at which the scheduled boarding time is set in the step S15 is 11:00 pm or later and the scheduled boarding time is a time that is not in the night time zone, then the period Tn in the night time zone is reduced by the difference between the present time and 23:00, and the period Td in the day time zone is a period from the end of the night time zone, i.e., 7:00, to the scheduled boarding time.

It is assumed that the night time zone is established as ranging from 23:00 to 7:00 in the next morning. The day time zone is a time in which the electric power consumption is more than that of the night time zone and the electric voltage to be supplied would be about 100 V during which time the voltage 200 V may be available using a timer. Stated otherwise, the voltage about 200 V would be supplied by way of activation of the timer from 23:00 to 7:00 whilst the voltage about 100 V would be supplied from 7:00 to 23:00. The step S22 is followed by a step S23 which determines whether the necessary charging period (Tc1+Tc2) is longer than Tn((Tc1+Tc2)>Tn) or not, i.e., whether the charging of the storage battery 22 is finished or not, i.e., the storage battery 22 is fully charged or not, within the period in the night time zone. If the necessary charging period (Tc1+Tc2) is not longer than Tn in the step S23, then since the storage battery 22 can be fully charged in the night time zone, the controller 21 sets a necessary charging time Tc3 to Tc3=0 in a step S30, and calculates a charging start time Ts=Tob−(Tc1+Tc2+Tc3 (=0)) in a step S29 (see "B" in FIG. 4), after which the charge holding mode "a" is executed to wait for the charging start time.

If (Tc1+Tc2)>Tn in the step S23, then since the charging of the storage battery 22 is not finished in the night time zone, i.e., the storage battery 22 cannot be fully charged in the night time zone, the controller 21 determines whether the power supply plug 12 is inserted in the corresponding power supply outlet or not in a step S24. If the power supply plug 12 is not inserted in the corresponding power supply outlet in the step S24, then since the voltage of 100 V is not supplied to the charger 2 and hence the storage battery 22 cannot be fully charged, a message indicating that the storage battery 22 cannot be fully charged is displayed on the display unit 55 in a step S31. The controller 21 sets the charging start time Ts to the present time (Ts=the present time) in a step S32. Thereafter, the controller 21 executes the charge holding mode "a" and then starts charging the storage battery 22.

If the power supply plug 12 is inserted in the corresponding power supply outlet in the step S24, then the voltage of 100 V is supplied to the charger 2, and the controller 21 determines whether the necessary charging period Tc1 is Tc1>Tn or not in a step S25.

If the necessary charging period Tc1 is Tc1>Tn in the step S25, then the necessary charging period Tc1 alone exceeds the night time zone Tn, and the controller 21 calculates Tc1=Tn, Tc2=0, Tc3=(D−Tn·0.2(C/H))/0.05(C/H) in a step S26. Specifically, in the step S26, the controller 21 calculates a charging period required to charge, with a current of 0.05(C/H) after the night time zone, the amount of discharged electric energy which remains uncharged at the end of the night time zone after the storage battery 22 has been charged with a current of 0.2(C/H) during the period in the night time zone. Of course, when Tc1 is determined to be larger than Tn in step S25, the charging period (Tc1+Tc2) necessarily will be larger than Tn in step S23.

After the step S26, the controller 21 determines whether the necessary charging time Tc3 is Tc3>Td or not in a step S27. If the necessary charging time Tc3 is not Tc3>Td, then the charging of the storage battery 22 is completed in the day time zone, and the controller 21 calculates a charging start time Ts=Tob−(Tc1+Tc2+Tc3) in the step S29. Thereafter, the controller 21 executes the subroutine of the sequence for the charge holding mode "a" to wait for the charging start time Ts.

If the necessary charging period Tc1 is not Tc1>Tn in the step S25, then the controller 21 calculates Tc2=Tn−Tc1, Tc3=4–Tc2 in a step S28, and thereafter executes the step S27. Specifically, in the step S28, the controller 21 calculates a charging period required to charge the storage battery 22 with a current of 0.05(C/H) in the night time zone and a charging period required to charge, with a current of 0.05 (C/H) after the night time zone, the amount of discharged electric energy which remains uncharged even after the charging in the night time zone.

If the necessary charging time Tc3 is Tc3>Td in the step S27, then the controller 21 executes the steps S31, S32.

If only the power supply plug 12 is inserted in the corresponding power supply outlet in the step S17, then the controller 21 calculates a necessary charging period Tc=D/0.05(C/H), i.e., a charging period required to charge the storage battery 22 with a current of 0.05(C/H) until it is fully charged, in a step S33. After the step S33, the controller 21 calculates a chargeable period Tp as the period between the scheduled boarding time and the present time in a step S34.

The controller 21 thereafter determines whether the necessary charging period Tc is Tc>Tp or not in a step S35. If the necessary charging period Tc is Tc>Tp, then the controller 21 executes the steps S31, S32. This is because the storage battery 22 will not be fully charged even if it is charged with a current of 0.05(C/H) until the charging start time is reached. If the necessary charging period Tc is not Tc>Tp in the step S35, then the controller 21 calculates a charging start time Ts=Tob–Tc in a step S36. Thereafter, the controller 21 executes the subroutine of the sequence for the charge holding mode "a" to wait for the charging start time Ts.

The subroutine of the sequence for setting a charging start time in the constant-current/constant-voltage charging mode will be described below with reference to FIGS. 5 and 6.

A scheduled boarding time Tob is established by the scheduled boarding time setting key switch 53, and is read and stored in the RAM 21b in a step S40. The amount of electric energy discharged from the storage battery 22, which has been integrated and stored, is also read and stored in the RAM 21b in a step S41.

The step S41 is followed by a step S42 which determines if a power supply plug is inserted in a power supply outlet, based on an output signal from the tap switching circuit 15 and an output signal from the plug connection detecting switch 11A. If both the power supply plugs 11, 12 are not inserted in the respective power supply outlets, then a message indicating that no power supply is connected is displayed on the display unit 55 in a step S43, and the controller 21 waits for a power supply plug to be inserted in a power supply outlet.

If the power supply plug 11 is inserted in the corresponding power supply outlet in the step S42, then control goes to a step S44 in which the controller 21 refers to a table, stored in the ROM 21a, of amounts D of discharged electric energy and necessary charging periods at the time the storage battery 22 is charged with the 200 V-power supply, and reads from the table a necessary charging period Tc corresponding to the amount D of discharged electric energy that has been read in the step S41.

After the step S44, the controller 21 calculates a period (=Tn) in the night time zone and a period (=Td) in the day time zone based on the present time and the scheduled boarding time in a step S45. The step S45 is identical to the step S22.

Then, the controller 21 determines whether a necessary charging period Tc is Tc>Tn or not in a step S46. Stated otherwise, the controller 21 determines in the step S46 whether the charging of the storage battery 22 will be finished, i.e., the storage battery 22 is fully charged, in the period in the night time zone.

If the necessary charging period Tc is Tc>Tn in the step S46, then since the storage battery 22 cannot be fully charged in the period in the night time zone, the controller 21 sets a necessary charging period Tc1 to Tc1=Tn in a step S47, thereby establishing a chargeable period in the night time zone. Then, the controller 21 determines whether the power supply plug 12 is inserted in the corresponding power supply outlet or not in a step S48. If the power supply plug 12 is not inserted in the corresponding power supply outlet, then the voltage of 100 V is not supplied to the charger 2 and hence the storage battery 22 cannot be fully charged, a message indicating that the storage battery 22 cannot be fully charged is displayed on the display unit 55 in a step S54. The controller 21 sets the charging start time Ts to the present time (Ts=the present time) in a step S55. Thereafter, the controller 21 executes the charge holding mode "a" and then starts charging the storage battery 22.

If the power supply plug 12 is inserted in the corresponding power supply outlet in the step S48, then the voltage of 100 V is supplied to the charger 2, and control goes to a step S49 in which the controller 21 refers to the table, stored in the ROM 21a, of amounts D of discharged electric energy and necessary charging periods at the time the storage battery 22 is charged with the 200 V-power supply, and reads from the table an amount D necessary to be charged, which remains to be fully charged when the storage battery 22 is charged for the period Tc1 set in the step S47, i.e., an amount D of discharged electric energy (remaining amount of discharged electric energy) that remains uncharged. The step S49 is followed by a step S50 in which the controller 21 refers to a table, stored in the ROM 21a, of amounts D of discharged electric energy and necessary charging periods at the time the storage battery 22 is charged with the 100 V-power supply, and reads from the table a necessary charging period Tc2 corresponding to the amount D of discharged electric energy (remaining amount of discharged electric energy) that remains uncharged.

After the step S50, the controller 21 determines whether the necessary charging period Tc2 is Tc2>Td or not in a step S51. If the necessary charging period Tc2 is Tc2>Td, then the storage battery 22 cannot be fully charged with the 100 V-power supply during the period Td in the day time zone, and a message indicating that the storage battery 22 cannot be fully charged is displayed on the display unit 55 in the step S54. Then, the controller 21 sets the charging start time Ts to the present time (Ts=the present time) in the step S55. Thereafter, the controller 21 executes the charge holding mode "a" and then starts charging the storage battery 22.

If the necessary charging period Tc2 is not Tc2>Td in the step S51, then the storage battery 22 can be fully charged until the charging start time by the charging in the period Tc1 with the 200 V-power supply and the charging in the period Tc2 with the 100 V-power supply, and the controller 21 calculates a charging start time Ts=Tob–(Tc1+Tc2) in a step S52. Thereafter, the controller 21 executes the subroutine of the sequence for the charge holding mode "a" to wait for the charging start time Ts.

If the necessary charging period Tc is not Tc>Tn in the step S46, then since the storage battery 22 can be fully charged in the night time zone, the controller 21 sets a necessary charging period Tc1 to Tc1=Tn and a necessary charging period Tc2 to Tc2=0 in a step S53, and then calculates a charging start time Ts=Tob–(Tc1+Tc2) in the step S52. Thereafter, the controller 21 executes the subroutine of the sequence for the charge holding mode "a" to wait for the charging start time Ts. In this case, the storage battery 22 is fully charged before it is charged by the 100 V-power supply, and a charging start time Ts is Ts=Tob−Tc1.

If only the power supply plug 12 is inserted in the corresponding power supply outlet in the step S42, then control goes to a step S56 in which the controller 21 refers to the table, stored in the ROM 21a, of amounts D of discharged electric energy and necessary charging periods at the time the storage battery 22 is charged with the 100 V-power supply, and reads from the table a necessary charging period Tc corresponding to the amount D of discharged electric energy. After the step S56, the controller 21 calculates a chargeable period Tp as the difference between the scheduled boarding time and the present time in a step S57.

Thereafter, the controller 21 determines whether the necessary charging period Tc is Tc>Tp or not in a step S58. If the necessary charging period Tc is Tc>Tp, then the controller 21 executes the steps S54, S55. This is because the storage battery 22 will not be fully charged even if it is charged for the period Tp, i.e., even if it is charged from the present time until the scheduled boarding time is reached.

If the necessary charging period Tc is not Tc>Tp in the step S58, then the controller 21 calculates a charging start time Ts=Tob−Tc in a step S59. Thereafter, the controller 21 executes the subroutine of the sequence for the charge holding mode "a" to wait for the charging start time Ts.

Figure 7:
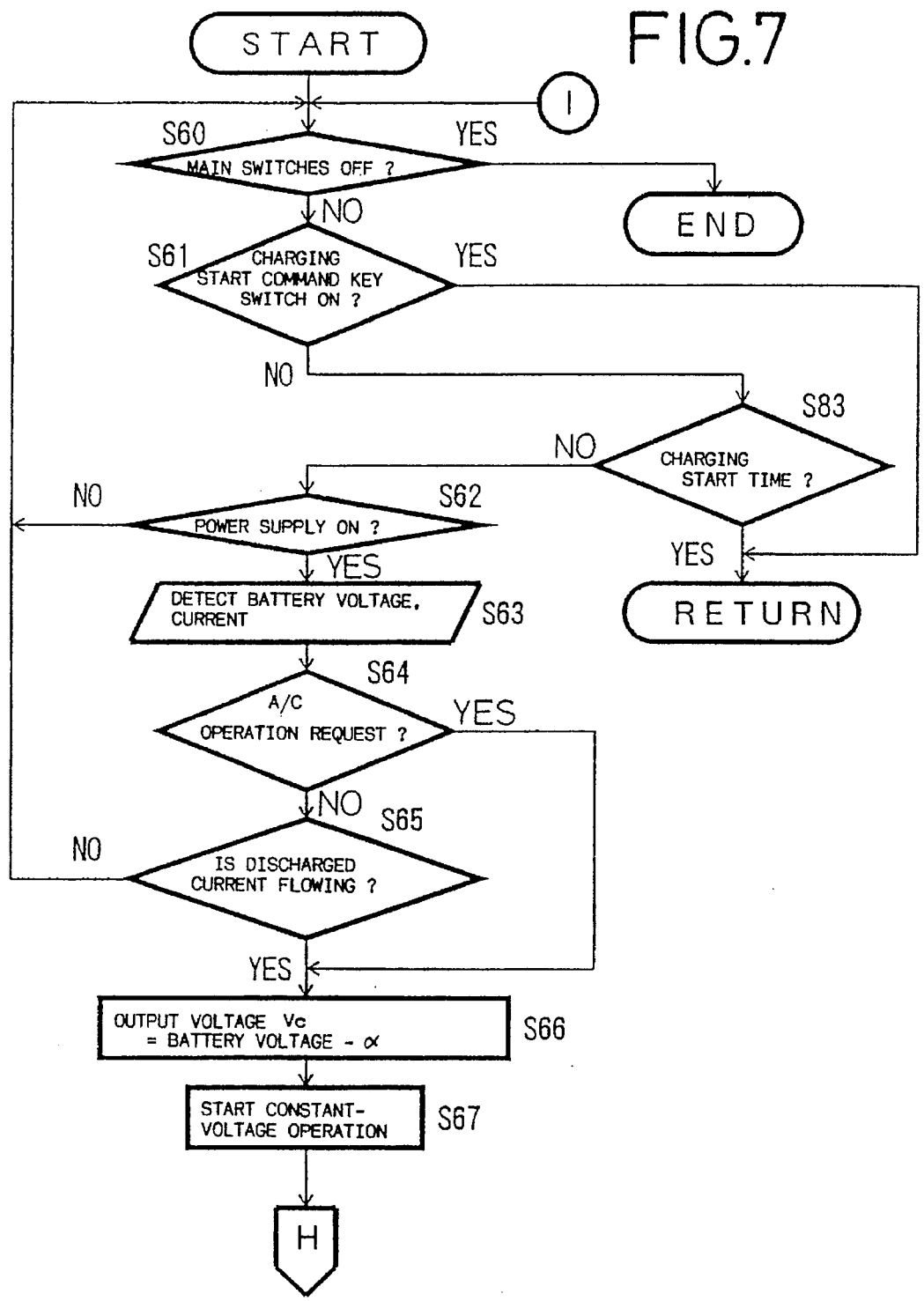
FIGS. 7 and 8 are flowcharts of a subroutine of a sequence for a charge holding mode "a" in the operation of the apparatus shown in FIG. 1.
Figure 8:
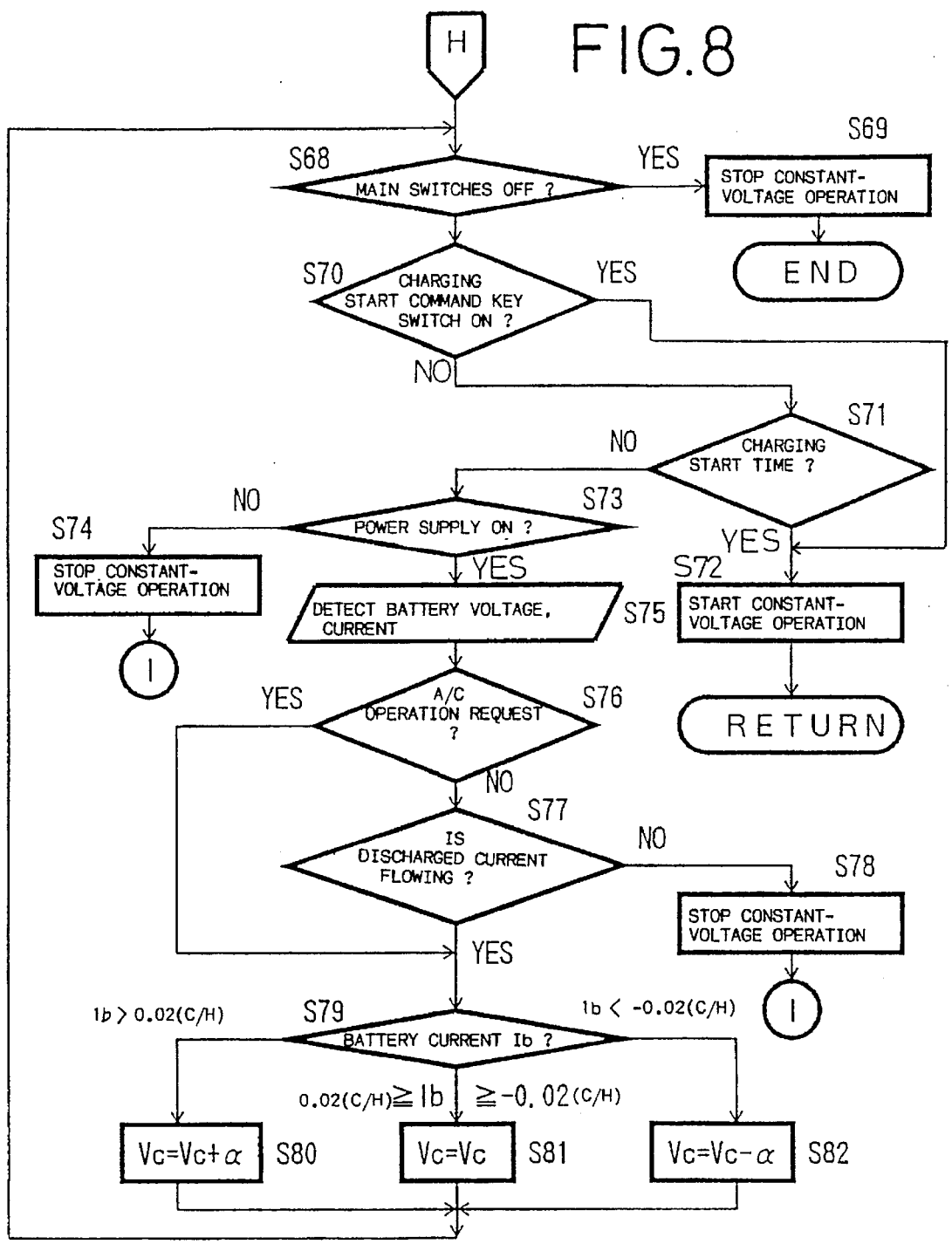
Figure 9:
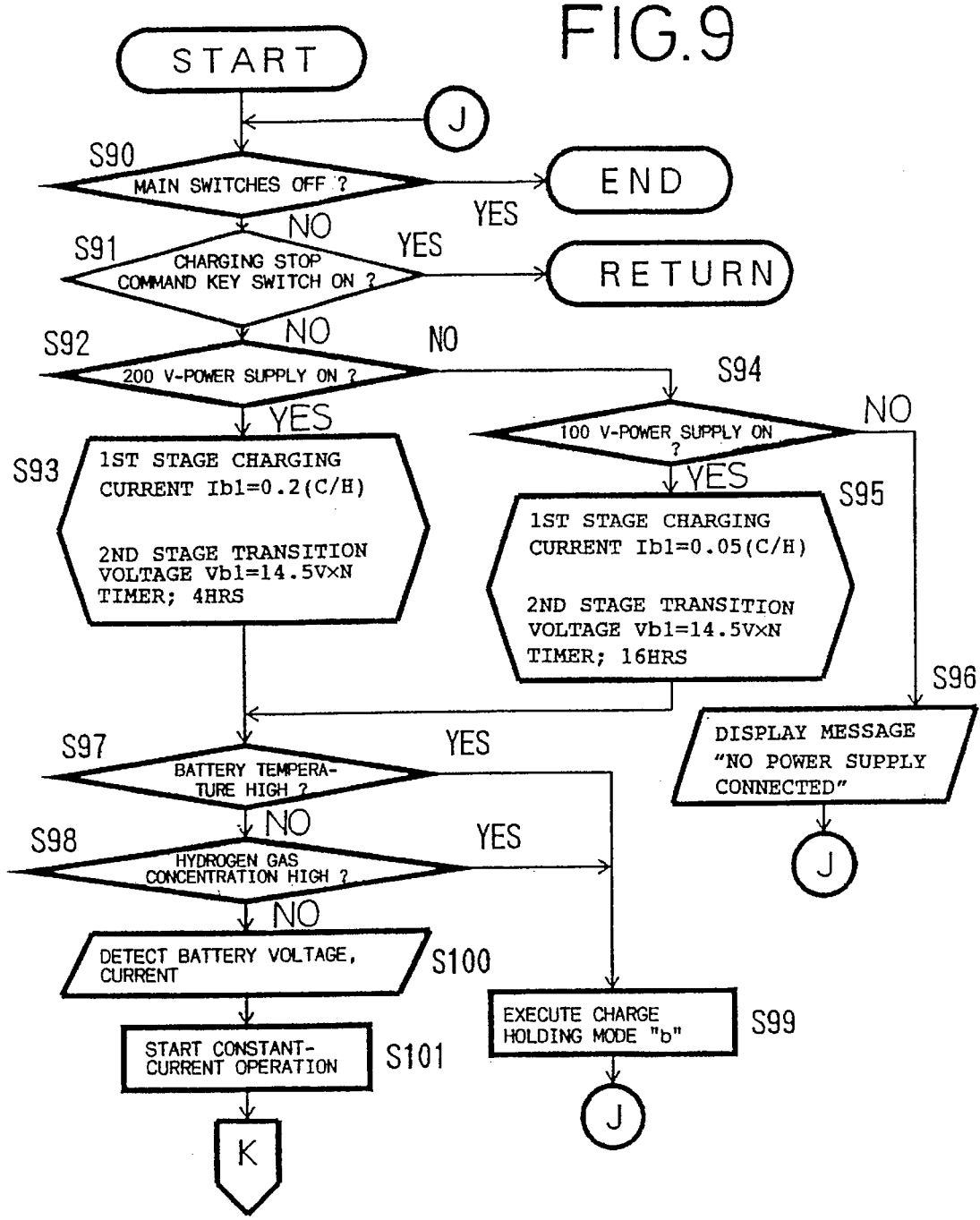
FIGS. 9 through 12 are flowcharts of a subroutine of a sequence for a constant-current/constant-current charging mode in the operation of the apparatus shown in FIG. 1.
Figure 10:
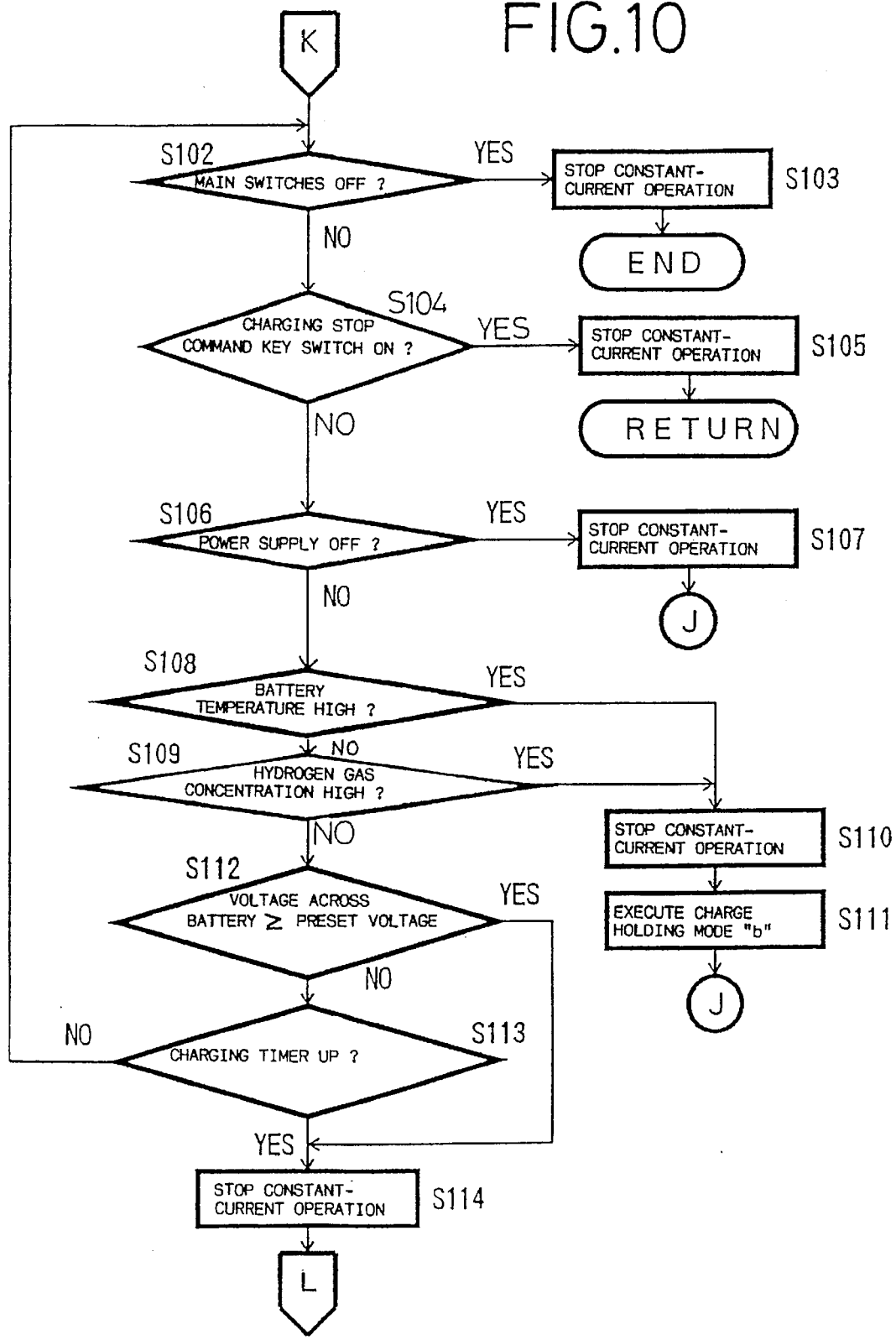
Figure 11:
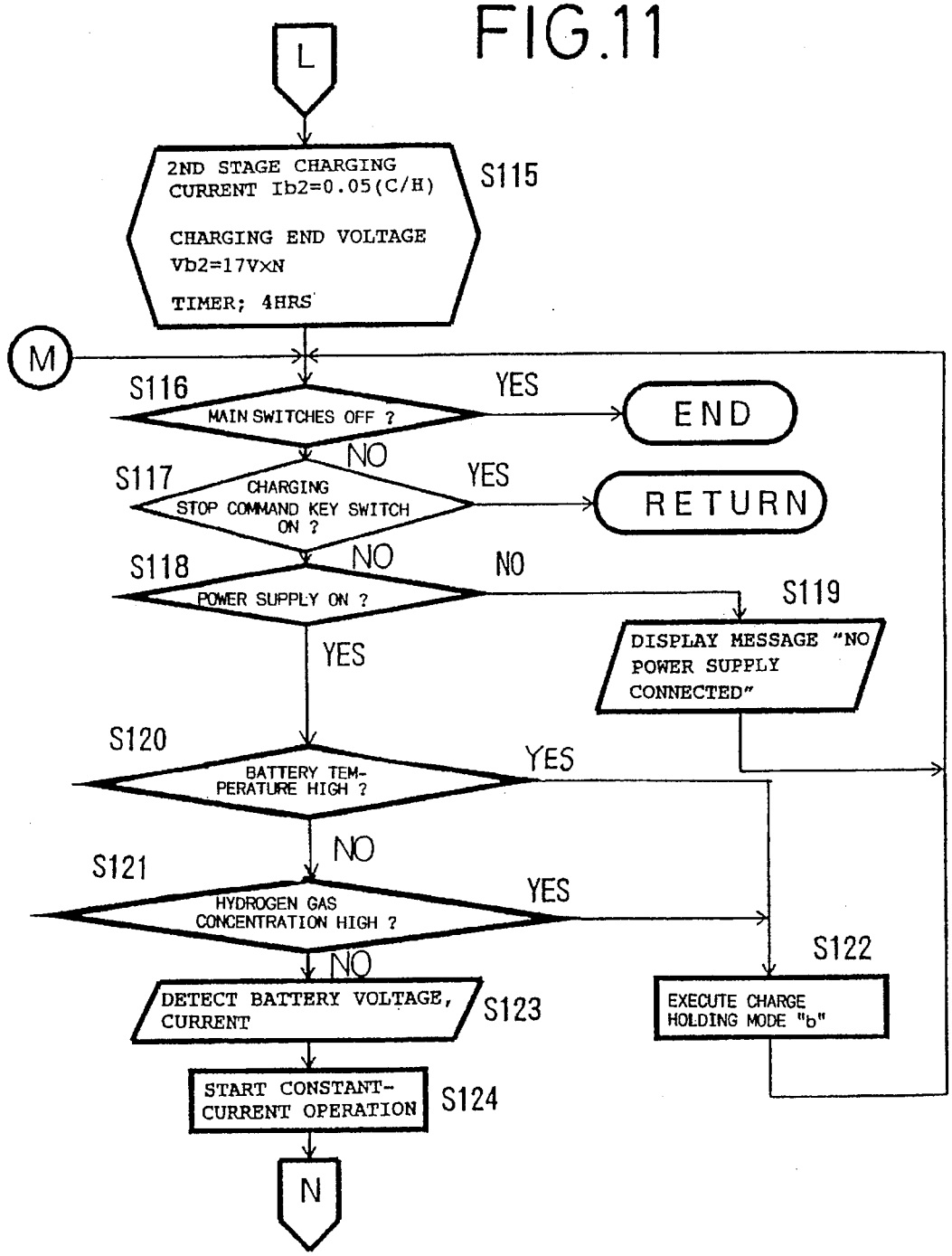
Figure 12:
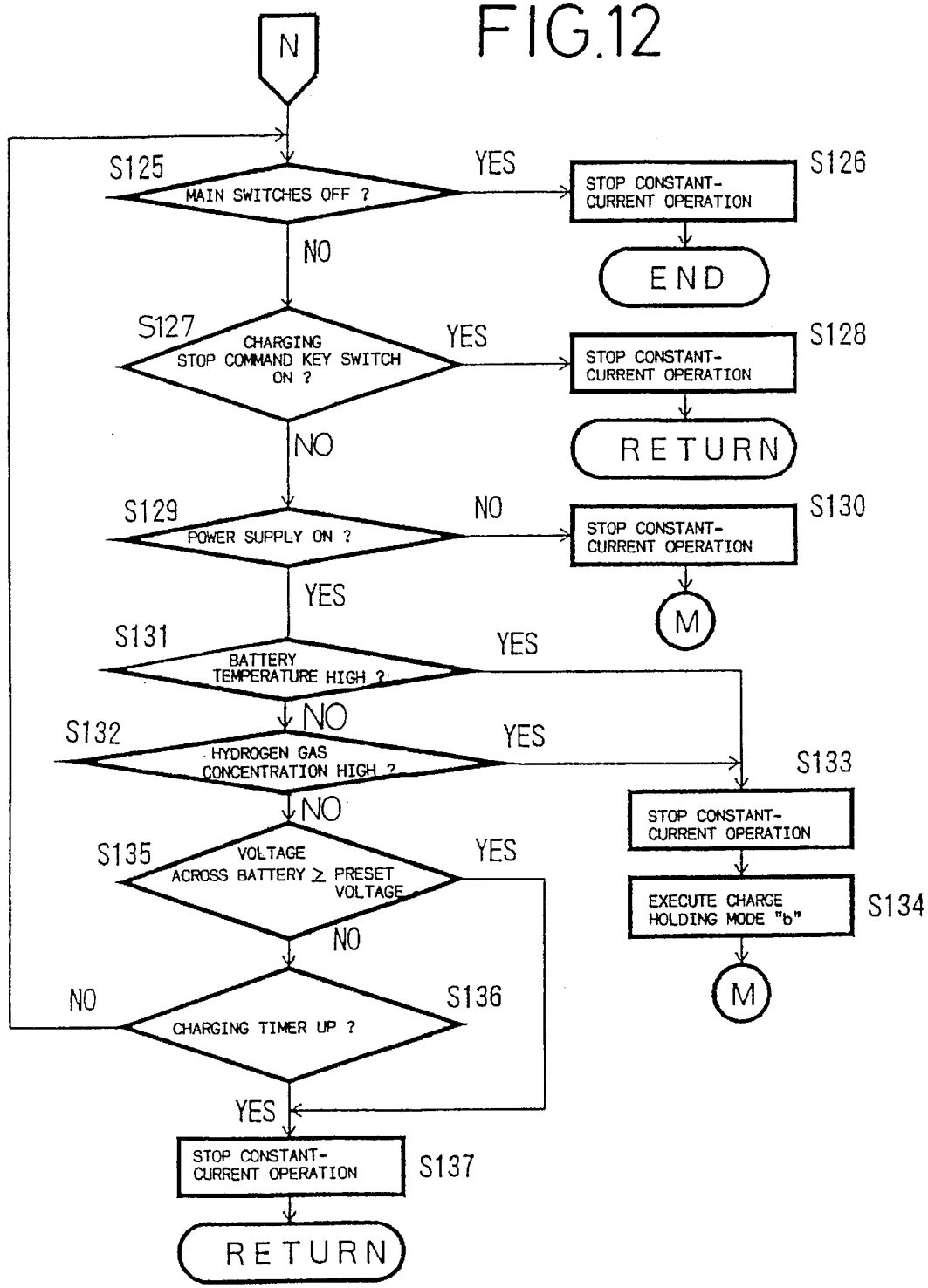
Figure 13:
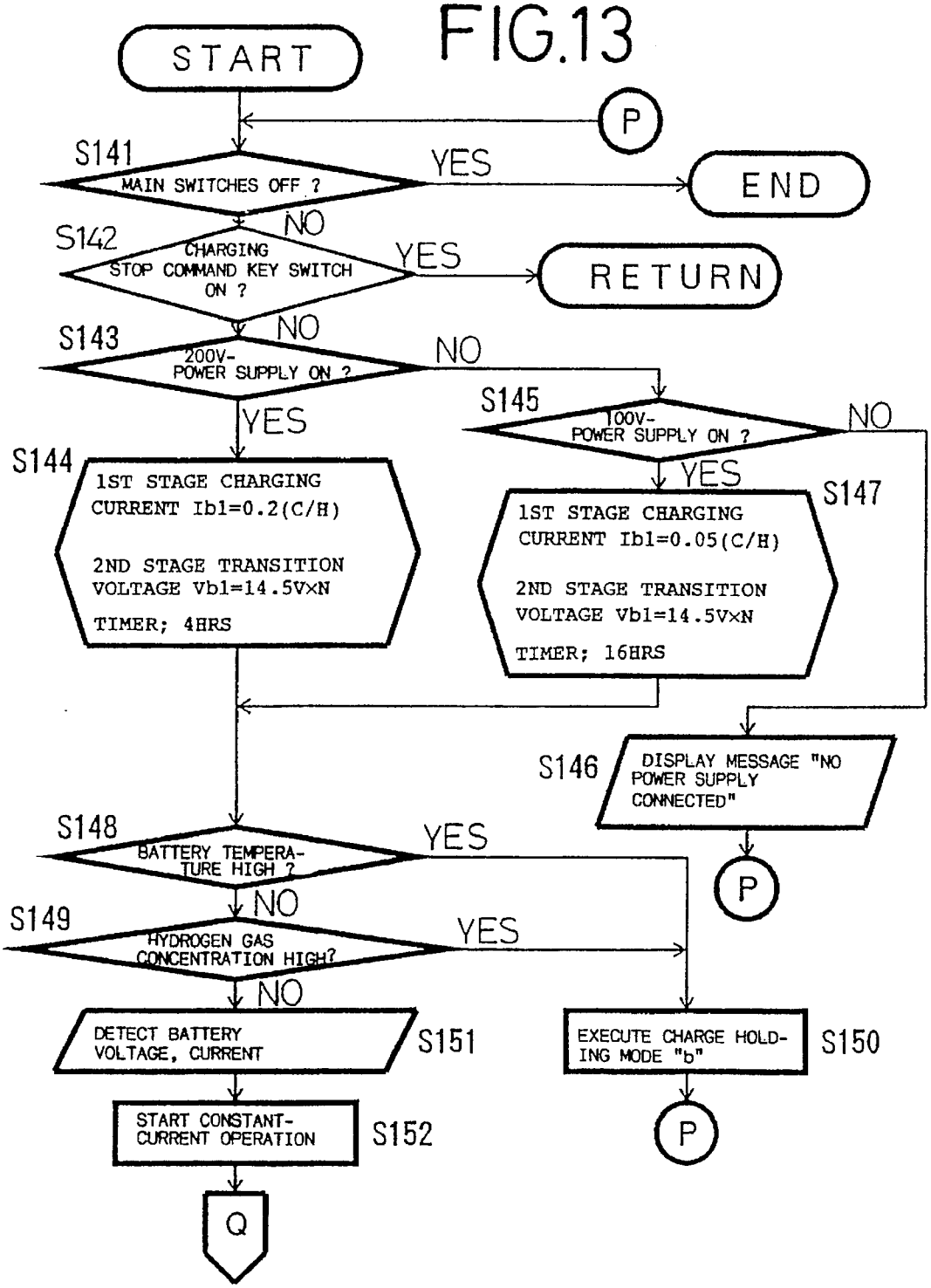
FIGS. 13 through 16 are flowcharts of a subroutine of a sequence for a constant-current/constant-voltage charging mode in the operation of the apparatus shown in FIG. 1.
Figure 14:
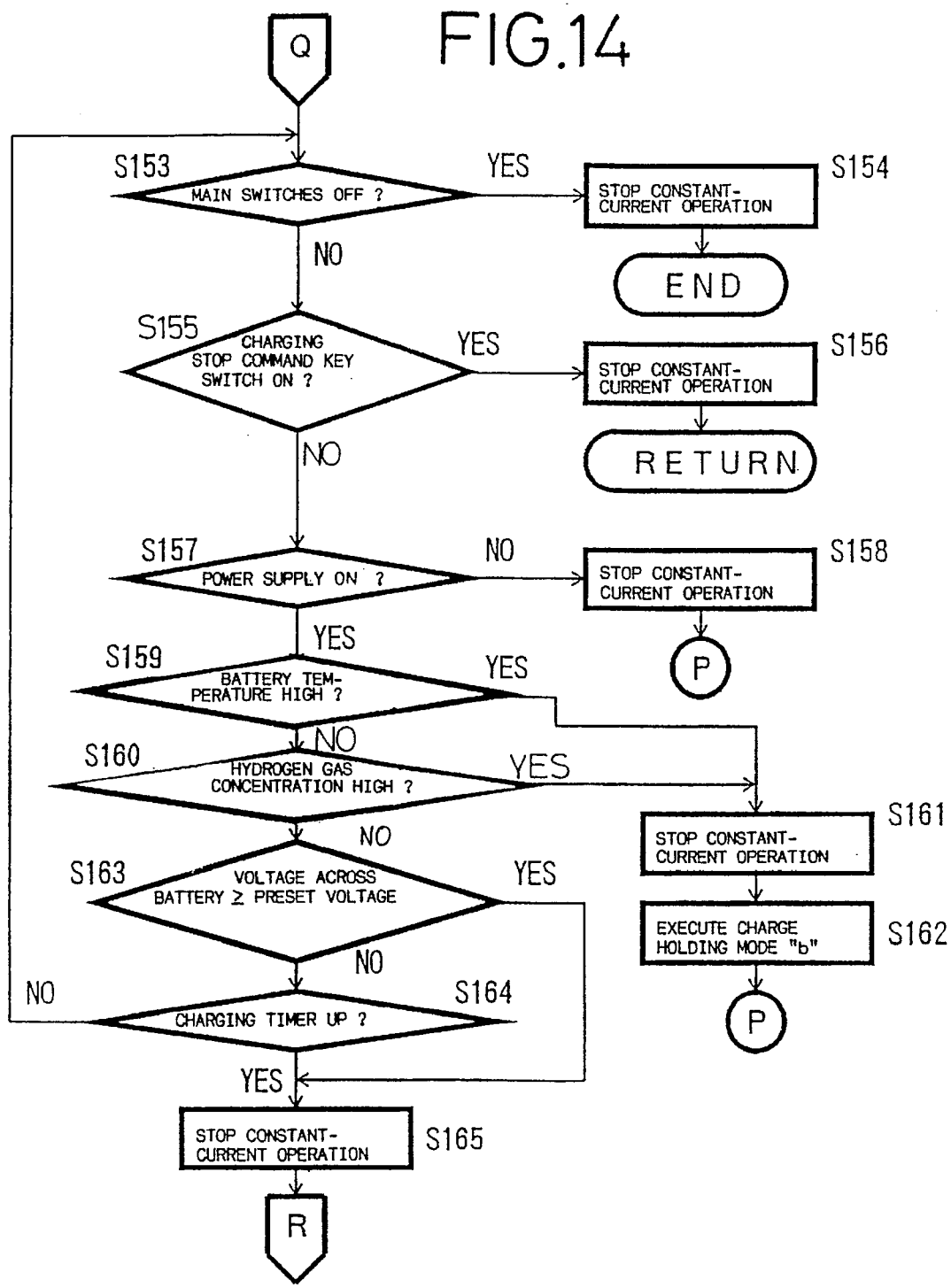
Figure 15:
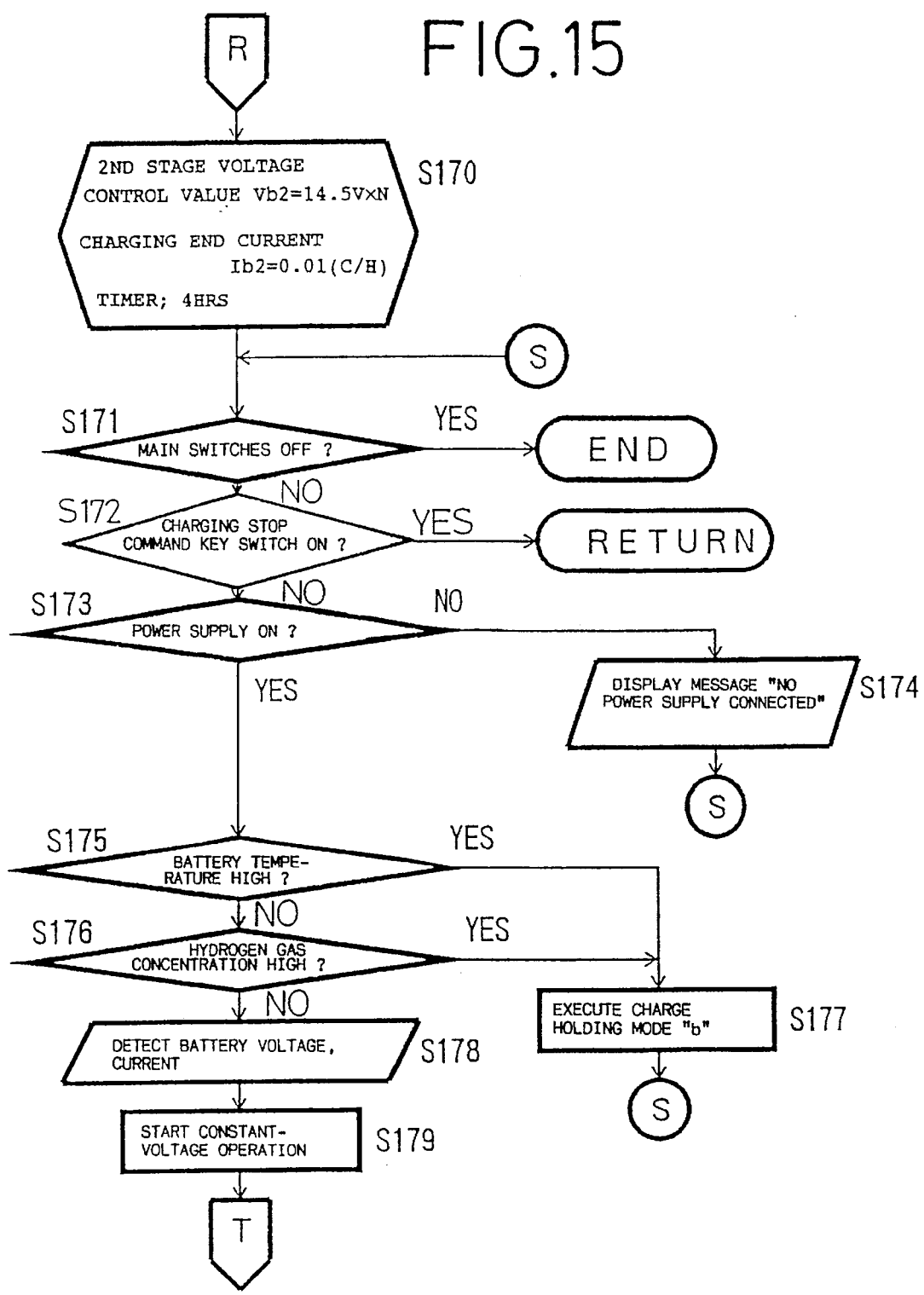
Figure 16:
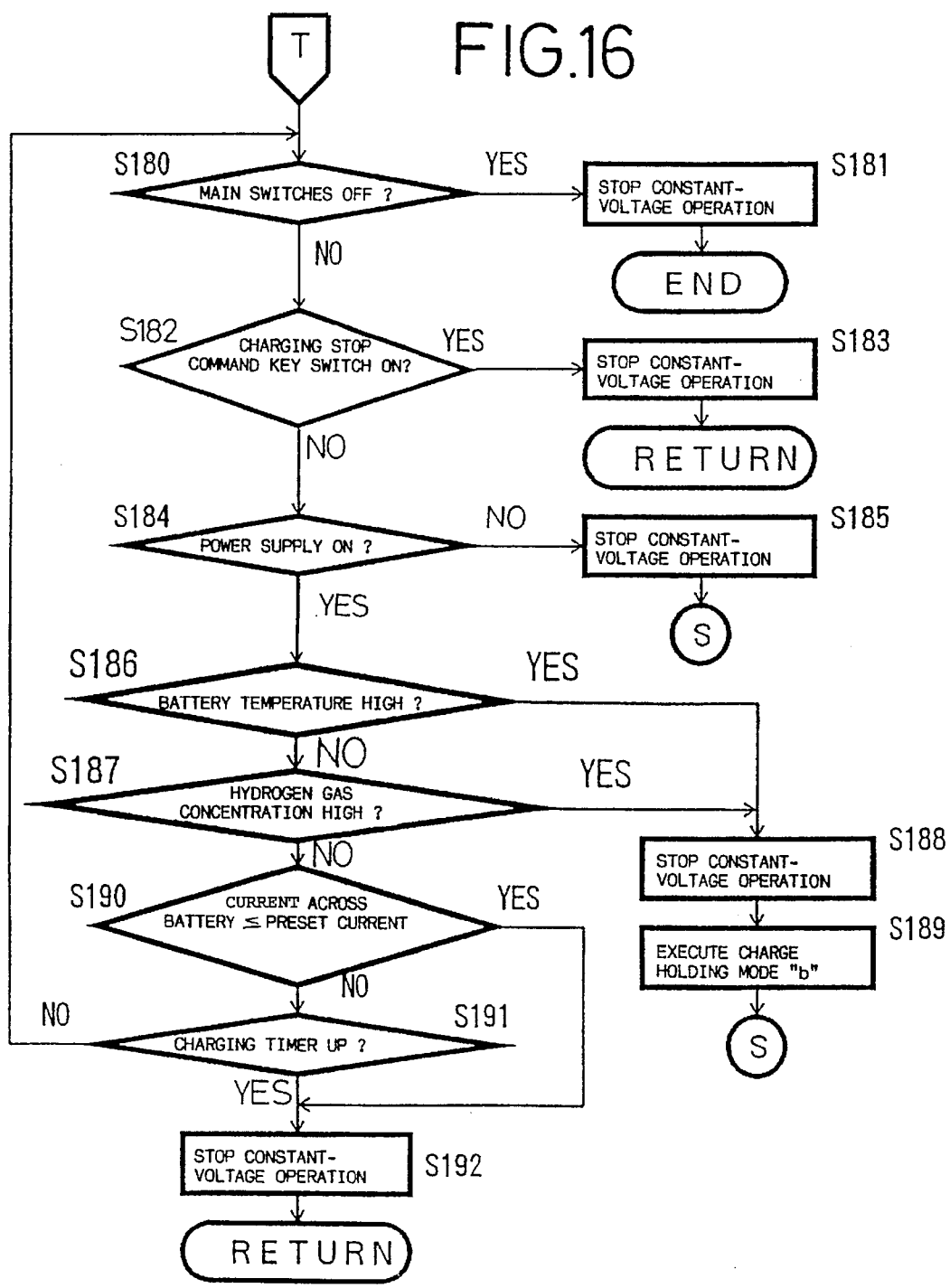
Figure 17:
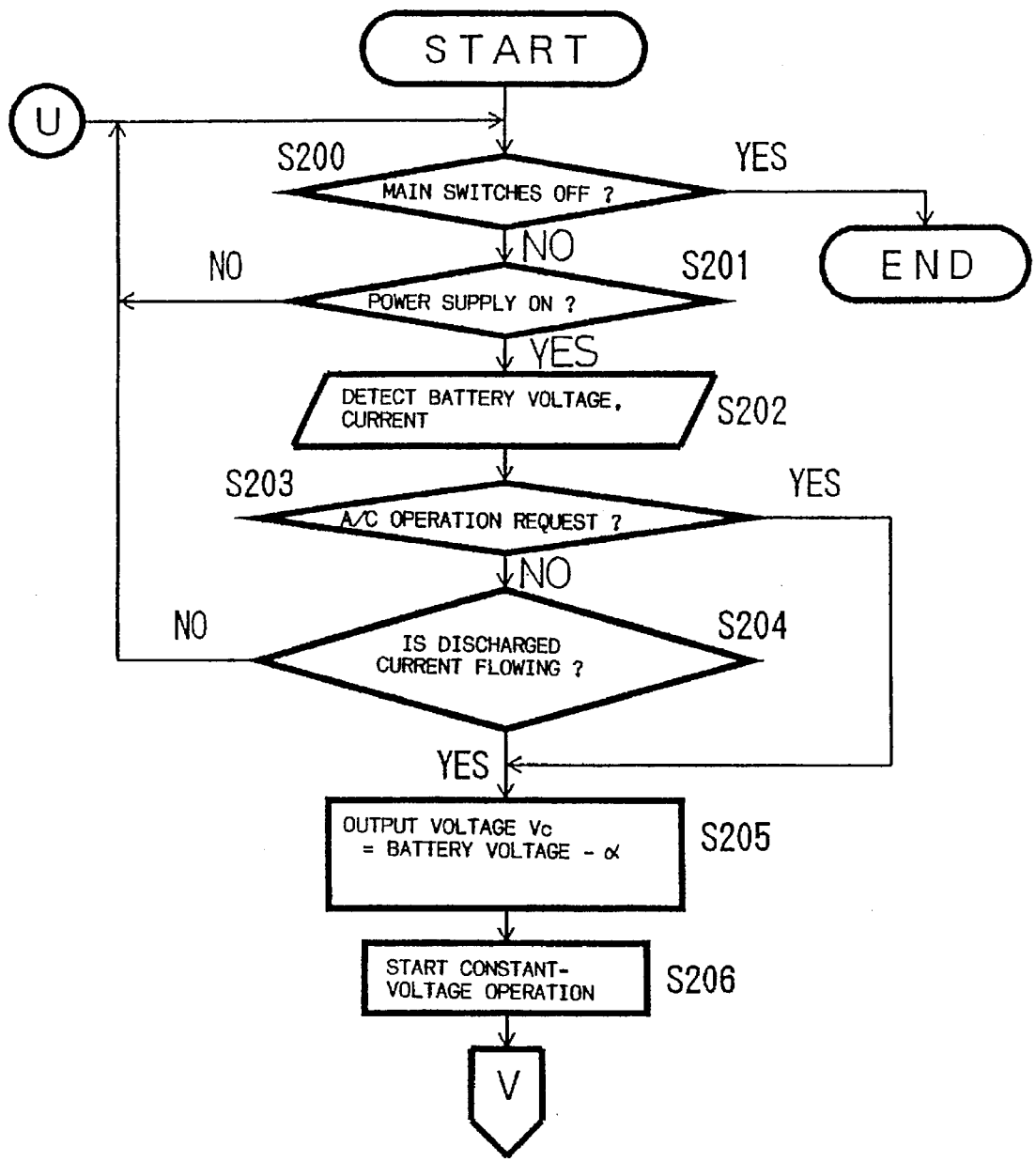
FIGS. 17 and 18 are flowcharts of a subroutine of a sequence for boarding waiting in the operation of the apparatus shown in FIG. 1.
Figure 18:
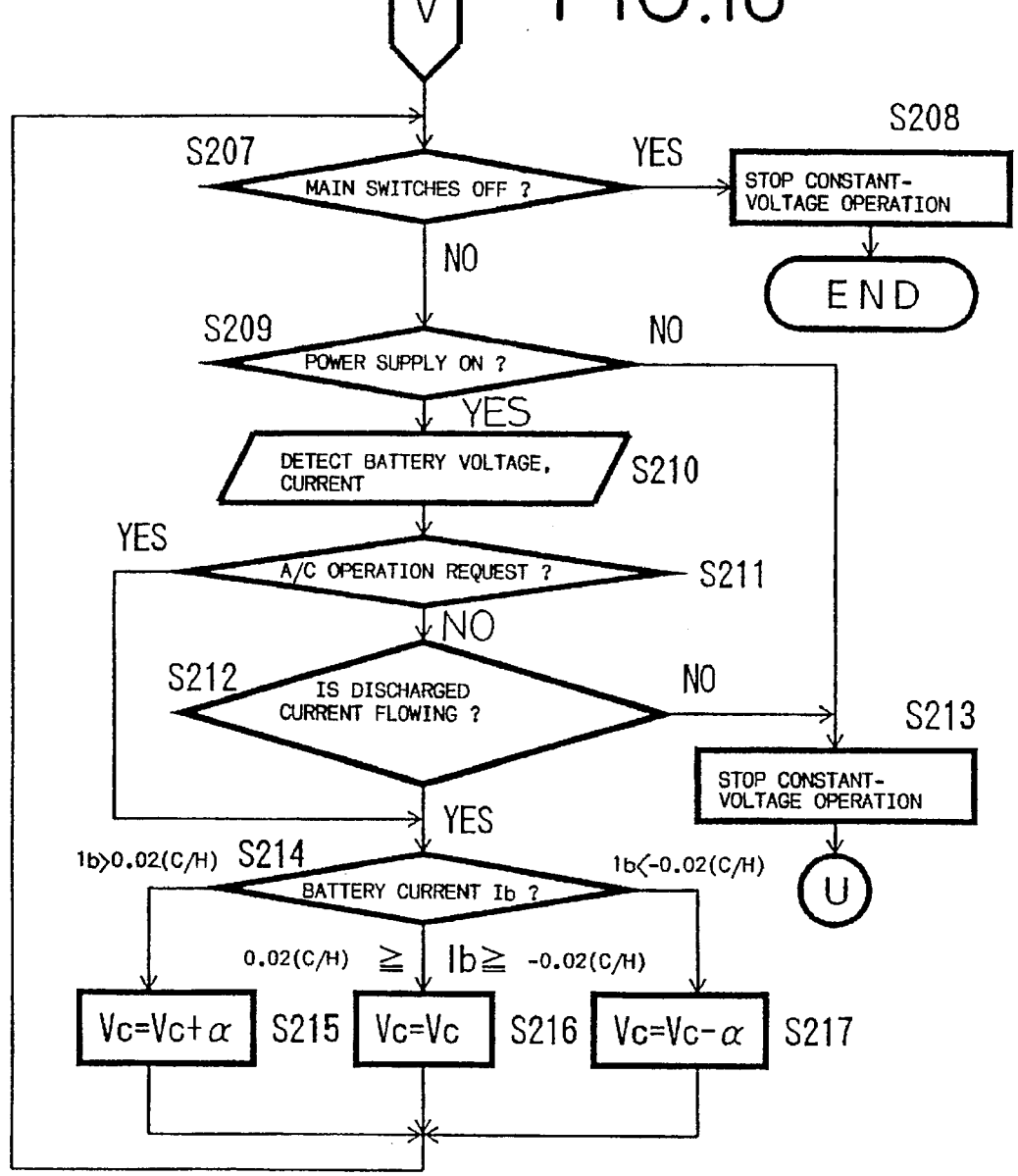

The subroutine of the sequence for the charge holding mode "a" will be described below with reference to FIGS. 7 and 8.

When the control enters the subroutine of the sequence for the charge holding mode "a", the controller 21 determines whether the main switches 13, 14 are turned off or not in a step S60. If the main switches 13, 14 are turned off, then the sequence for the charge holding mode "a" is ended. If the main switches 13, 14 are turned on, then the controller 21 determines whether the charging start command key switch 51 is turned on or not in a step S61. If the charging start command key switch 51 is turned on, then the charger 2 immediately starts charging the storage battery 22. If the charging start command key switch 51 is not turned on, then the controller 21 determines whether the charging start time has been reached or not in a step S83. If the charging start time has been reached, then the charger 2 starts charging the storage battery 22.

If the charging start time has not been reached in the step S83, then the controller 21 executes the step S60 and following steps again until the power supply voltage is supplied in a step S62. If the main switches 13, 14 are turned on, and the charging start command key switch 51 is turned on, and the charging start time has not been reached, then the voltage detector 24 detects a voltage across the storage battery 22 and the current detector 23 detects a current flowing to or from the storage battery 22 in a step S63.

After the step S63, the controller 21 determines whether the air-conditioning unit 30 issues an operation request or not by ascertaining if the switch 31 is turned on or not in a step S64. If the air-conditioning unit 30 does not issue an operation request, then the controller 21 determines whether a discharged current is flowing from the storage battery 22 or not in a step S65. If no discharged current is flowing from the storage battery 22, then the controller 21 executes the step S60 and following steps again.

If the air-conditioning unit 30 issues an operation request in the step S64 or if a discharged current is flowing from the storage battery 22 in the step S65, then the controller 21 controls the phase control circuit 19 to equalize an output voltage Vc from the thyristor bridge 20 to (the voltage across the storage battery 22−α) in a step S66. Specifically, the controller 21 determines that a discharged current is flowing from the storage battery 22 when any one of the accessories 40 is in operation. When the charger 2 operates under a constant voltage, the output voltage Vc from the thyristor bridge 20 is set to a constant voltage level that is slightly lower than the voltage across the storage battery 22 by an adjustment step range α. The range in which the current of the storage battery 22 is detected in the step S63 and the adjustment step range α are determined depending on the characteristics of the storage battery 22 and the charger 2 so as to minimize the current flowing to and from the storage battery 22.

After the step S66, the thyristor bridge 20 is controlled by the phase control circuit 19 to start producing the output voltage Vc at the constant voltage level in a step S67. Then, the controller 21 determines whether the main switches 13, 14 are turned off or not in a step S68. If the main switches 13, 14 are turned off, then the constant-voltage operation is stopped, and the sequence for the charge holding mode "a" is ended in a step S69. If the main switches 13, 14 are turned on in the step S68, then the controller 21 determines whether the charging start command key switch 51 is turned on or not in a step S70. If the charging start command key switch 51 is turned on, then the constant-voltage operation is started in a step S72, and the apparatus starts charging the storage battery 22. If the charging start command key switch 51 is turned off in the step S70, then the controller 21 determines whether the charging start time has been reached or not in a step S71. If the charging start time has been reached, then the constant-voltage operation is started in the step S72, and the apparatus starts charging the storage battery 22.

If the charging start time has not been reached in the step S71, then the controller 21 determines whether the power supplies are turned on or not in a step S73. If the power supplies are not turned on, then the constant-voltage operation is stopped in a step S74, and the controller 21 executes the step S60 and following steps again. Specifically, if the power supply plugs 11, 12 are not inserted in the respective power supply outlets, then the constant-voltage operation is stopped in the step S74, and the controller 21 executes the step S60 and following steps again. If the power supply plugs 11, 12 are inserted in the respective power supply outlets, i.e., if the power supplies are turned on in the step S73, then the voltage detector 24 detects the voltage across the storage battery 22 and the current detector 23 detects a charging current flowing to or a discharged current flowing from the storage battery 22 in a step S75. Thereafter, the controller 21 determines whether the air-conditioning unit 30 issues an operation request in a step S76. If the air-conditioning unit 30 does not issue an operation request, the controller 21 determines whether a discharged current is flowing from the storage battery 22 or not in a step S77. If no discharged current is flowing from the storage battery 22, then the constant-voltage operation is stopped in a step S78, and the controller 21 executes the step S60 and following steps again.

If the air-conditioning unit 30 issues an operation request in the step S76 or if a discharged current is flowing from the storage battery 22 in the step S77, then the controller 21 determines whether a current Ib flowing from the storage battery 22 is in a range of Ib>0.02(C/H), or 0.02(C/H) ≧Ib≧−0.02(C/H), or Ib<−0.02(C/H) in a step S79.

If the current Ib flowing from the storage battery 22 is in the range of Ib>0.02(C/H), then the storage battery 22 is being discharged, and the controller 21 controls the phase control circuit 19 to set the output voltage Vc from the thyristor bridge 20 to a voltage (Vc+α) in a step S80, after which control returns to the step S68. Therefore, each time the step S80 is executed, the output voltage from the thyristor bridge 20 is incremented by α.

If the current Ib flowing from the storage battery 22 is in the range of 0.02(C/H)≧Ib≧−0.02(C/H) in the step S79, then the controller 21 controls the phase control circuit 19 to set the output voltage Vc from the thyristor bridge 20 to the voltage Vc in a step S81, after which control returns to the step S68. In this case, the storage battery 22 is neither being discharged nor charged, and the output voltage Vc from the thyristor 20 is maintained.

If the current Ib flowing from the storage battery 22 is in the range of Ib<−0.02(C/H) in the step S79, then the storage battery 22 is being charged, and the controller 21 controls the phase control circuit 19 to set the output voltage Vc from the thyristor bridge 20 to a voltage (Vc−α) in a step S82, after which control returns to the step S68. Therefore, each time the step S82 is executed, the output voltage from the thyristor bridge 20 is incremented by (−α).

Therefore, when the air-conditioning unit 30 is actuated or any one of the accessories 40 is actuated in the charge holding mode "a" before the charging start time is reached, the steps S79, S80 are executed to supply electric currents from the thyristor bridge 20 to the air-conditioning unit 30 and the accessories 40, and the amount of electric energy discharged from the storage battery 22 is not increased.

When the current Ib flowing from the storage battery 22 is in the range of Ib<−0.02(C/H) in the charge holding mode "a" before the charging start time is reached, the steps S79, S82 are executed to prevent the storage battery 22 from being charged by the charger 2.

When the charging start time is reached in the charge holding mode "a", one of charging subroutines is executed.

FIGS. 9 through 12 show a subroutine of a sequence for a two-stage constant-current/constant-current charging mode in which the subroutine of the sequence for setting a charging start time corresponds to a two-stage constant-current/constant-current charging mode. FIGS. 13 through 16 show a two-stage charging mode with a constant current at a first stage and a constant voltage at a second stage, in which the subroutine of the sequence for setting a charging start time corresponds to a two-stage constant-current/constant-voltage charging mode.

The subroutine of the sequence for the two-stage constant-current/constant-current charging mode will first be described below with reference to FIGS. 9 through 12.

When the control enters the subroutine of the sequence for the two-stage constant-current/constant-current charging mode, the controller 21 determines whether the main switches 13, 14 are turned off or not in a step S90. If the main switches 13, 14 are turned off, then the sequence for the charging mode is ended. If the main switches 13, 14 are turned on, then the controller 21 determines whether the charging stop command key switch 52 is turned on or not in a step S91. If the charging stop command key switch 52 is turned on, then control returns to the sequence for boarding waiting, i.e. waiting for passengers to board the electric vehicle.

If the charging stop command key switch 52 is not turned on, then the controller 21 determines whether the power supply plug 11 is inserted in its corresponding power supply outlet or not in a step S92. If inserted, i.e., if the voltage of 200 V is supplied, then charging by the controller 21 is initialized in a step S93. Specifically, in the step S93, a charging current Ib1 at a first stage is set to Ib1=0.2(C/H), a voltage Vb1 across the storage battery 22 for transition to charging at a second stage is set to Vb1=14.5 V×N (N is the number of series-connected cells of the storage battery 22), and a charging timer is set to 4 hours. In the second-stage constant-current/constant-current charging mode, for example, the storage battery 22 having a capacity of 50 AH is charged with 0.2(C/H) of 10 A to a charging level of about 80%, and then with 0.05(C/H) of 2.5 A until it is fully charged. If the amount of discharged electric energy is very large and the remaining amount of stored electric energy is small, then the controller 21 is initialized to charge the storage battery 22 with a charging current of 0.2(C/H) for about 4 hours to a charging level of 80% and then fully charge the storage battery 22 with a charging current of 0.05(C/H) for about 4 hours. The charging timer is employed to prevent the storage battery 22 from being continuously charged when the voltage across the storage battery 22 does not increase up to a fully charged level due to a battery fault or the like even if the storage battery 22 has been charged for a period of time that is theoretically sufficient to fully charge the storage battery 22.

If the power supply plug 11 is not inserted in the corresponding power supply outlet in the step S92, then the controller 21 determines whether the power supply plug 12 is inserted in its corresponding power supply outlet or not in a step S94. If the power supply plug 12 is not inserted in its corresponding power supply outlet, then a message indicating that no power supply is connected is displayed on the display unit 55 in a step S96. Thereafter, the controller 21 executes the step S90 and following steps again.

If the power supply plug 12 is inserted in its corresponding power supply outlet, i.e., if only the voltage of 100 V is supplied, then the controller 21 is initialized in a step S95. Specifically, in the step S95, a charging current Ib1 at a first stage is set to Ib1=0.05(C/H), a voltage Vb1 across the storage battery 22 for transition to charging at a second stage is set to Vb1=14.5 V×N (the number of series-connected cells of the storage battery 22), and a charging timer is set to 16 hours. If, for example, the number of series-connected cells of the storage battery 22 is 24 and the charging voltage has an upper limit of 408 V, then the voltage of a single cell is 17 V and the charging current is 0.05(C/H) (=2.5 A), with an output energy of the storage battery 22 being about 1 kW (1020 W). In this specification, the voltage of a single cell under no load is assumed to be 17 V.

The charging timer for protecting the storage battery 22 is set to 16 hours in the step S95 because the storage battery 22 is charged up to a charging depth of about 80% by charging at the first stage, i.e., with a target constant current of 0.05(C/H) for 16 hours.

After the steps S93, S95, the controller 21 determines whether or not the temperature inside the storage battery 22, as detected by the temperature detector 26, is equal to or higher than a predetermined temperature in a step S97. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S98. If the temperature is equal to or higher than the predetermined temperature in the step S97 or if the hydrogen gas concentration is equal to or higher than the predetermined concentration in the step S98, then the controller 21 executes a charge holding mode "b" in a step S99. Thereafter, the controller 21 executes the step S90 and following steps again.

If the storage battery 22 were charged when the hydrogen gas concentration detected by the hydrogen concentration detector 25 is equal to or higher than the predetermined concentration or when the temperature detected by the temperature detector 26 is equal to or higher than the predetermined temperature, then the service life of the storage battery 22 would be reduced. In this case, the charge holding mode "b" is executed to wait until the hydrogen gas concentration and the temperature is lowered. The charge holding mode "b" will be described later on.

The controller 21 determines whether or not the temperature inside the storage battery 22, as detected by the temperature detector 26, is equal to or higher than the predetermined temperature or not in the step S97 and whether or not the concentration of a hydrogen gas generated by the storage battery 22, as detected by the hydrogen concentration detector 25, is equal to or higher than the predetermined concentration in the step S98, because if the storage battery 22 were charged when the hydrogen gas concentration detected by the hydrogen concentration detector 25 is equal to or higher than the predetermined concentration or when the temperature detected by the temperature detector 26 is equal to or higher than the predetermined temperature, then the service life of the storage battery 22 would be reduced, as described above.

If the hydrogen gas concentration is lower than the predetermined concentration in the step S98, then the voltage detector 24 detects a voltage across the storage battery 22 and the current detector 23 detects a current flowing to or from the storage battery 22 in a step S100. Thereafter, the thyristor bridge 20 is controlled by the phase control circuit 19 to output a constant current of 0.2(C/H) at a first stage when the voltage of 200 V is supplied, or to output a constant current of 0.05(C/H) at a first stage when only the voltage of 100 V is supplied, and the charging timer starts measuring time in a step S101.

After the step S101, the controller 21 determines whether the main switches 13, 14 are turned off or not in a step S102. If the main switches 13, 14 are turned off, then the constant-current operation to output the constant current from the thyristor bridge 20 is stopped in a step S103. If the main switches 13, 14 are not turned off, then the controller 21 determines whether the charging stop command key switch 52 is turned on or not in a step S104. If the charging stop command key switch 52 is turned on, then the constant-current operation is stopped in a step S105. Thereafter, control returns to the sequence for boarding waiting.

If the charging stop command key switch 52 is not turned on in the step S104, then the controller 21 determines whether the power supply plugs 11, 12 are inserted in their corresponding power supply outlets or not in a step S106. If not inserted, then the constant-current operation is stopped in a step S107, and the controller 21 executes the step S90 and following steps again.

If the power supply plug 11 or 12 is inserted in its corresponding power supply outlets in the step S106, then the controller 21 determines whether or not the temperature inside the storage battery 22, as detected by the temperature detector 26, is equal to or higher than a predetermined temperature in a step S108. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S109. If the temperature is equal to or higher than the predetermined temperature in the step S108 or if the hydrogen gas concentration is equal to or higher than the predetermined concentration in the step S109, then the constant-current operation is stopped in a step S110, and the charge holding mode "b" is executed in a step S111. Thereafter, the controller 21 executes the step S90 and following steps again.

If the hydrogen gas concentration is lower than the predetermined concentration in the step S109, then the controller 21 determines whether or not a voltage across the storage battery 22 is equal to or higher than a voltage Vb1 (=14.5 V×N (the number of series-connected cells of the storage battery 22)) for transition to the second stage in a step S112. If the voltage across the storage battery 22 is lower than the voltage Vb1, then the controller 21 determines whether the preset time measured by the charging timer is up or not in a step S113.

If the preset time measured by the charging timer is not up, then the controller 21 executes the step S102 and following steps again. If the constant current is set to 0.2(C/H) in the step S101, then the controller 21 determines whether 4 hours have elapsed or not in the step S113. If the constant current is set to 0.05(C/H) in the step S101, then the controller 21 determines whether 16 hours have elapsed or not in the step S113.

If the time measured by the charging timer is up in the step S113 or if the voltage across the storage battery 22 is equal to or higher than the voltage Vb1 in the step S112, then the constant-current operation is stopped in a step S114, and thereafter the controller 21 sets a charging current to a constant current of 0.05(C/H) at the second stage and also sets a charging end voltage Vb2 to Vb2=17 V×N (the number of series-connected cells of the storage battery 22) in a step S115. When the preset time of the charging timer elapses or the voltage across the storage battery 22 reaches the voltage for transition to the second stage, then the controller 21 effects the second-stage charging.

After the step S115, the controller 21 determines whether the main switches 13, 14 are turned off or not in a step S116. If the main switches 13, 14 are turned off, then the charging mode is ended. If the main switches 13, 14 are not turned off, then the controller 21 determines whether the charging stop command key switch 52 is turned on or not in a step S117. If the charging stop command key switch 52 is turned on, then control returns to the sequence for boarding waiting.

If the charging stop command key switch 52 is not turned on in the step S117, then the controller 21 determines whether the power supply plugs 11, 12 are inserted in their corresponding power supply outlets or not in a step S118. If not inserted, then a message indicating that no power supply is connected is displayed on the display unit 55 in a step S119. Thereafter, the controller 21 executes the step S116 and following steps again.

If the power supply plug 11 or 12 is inserted in its corresponding power supply outlet in the step S118, then the controller 21 determines whether or not the temperature inside the storage battery 22, as detected by the temperature detector 26, is equal to or higher than a predetermined temperature in a step S120. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S121. If the temperature is equal to or higher than the predetermined temperature in the step S120 or if the hydrogen gas concentration is equal to or higher than the predetermined concentration in the step S121, then the charge holding mode "b" is executed in a step S122. Thereafter, the controller 21 executes the step S116 and following steps again.

If the hydrogen gas concentration is lower than the predetermined concentration in the step S121, then the voltage detector 24 detects a voltage across the storage battery 22 and the current detector 23 detects a current flowing to or from the storage battery 22 in a step S123. Thereafter, the thyristor bridge 20 is controlled by the phase control circuit 19 to output a constant current of 0.05(C/H) at the second stage, and the charging timer starts measuring time in a step S124.

After the step S124, the controller 21 determines whether the main switches 13, 14 are turned off or not in a step S125. If the main switches 13, 14 are turned off, then the constant-current operation is stopped in a step S126, whereupon the charging of the storage battery 22 is finished. If the main switches 13, 14 are not turned off, then the controller 21 determines whether the charging stop command key switch 52 is turned on or not in a step S127. If the charging stop command key switch 52 is turned on, then the constant-current operation is stopped in a step S128. Thereafter, control returns to the sequence for boarding waiting.

If the charging stop command key switch 52 is not turned on in the step S127, then the controller 21 determines whether the power supply plugs 11, 12 are inserted in their corresponding power supply outlets or not in a step S129. If not inserted, then the constant-current operation is stopped in a step S130, and the controller 21 executes the step S116 and following steps again.

If the power supply plug 11 or 12 is inserted in their corresponding power supply outlets in the step S129, then the controller 21 determines whether or not the temperature inside the storage battery 22, as detected by the temperature detector 26, is equal to or higher than a predetermined temperature in a step S131. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S132. If the temperature is equal to or higher than the predetermined temperature in the step S131 or if the hydrogen gas concentration is equal to or higher than the predetermined concentration in the step S132, then the constant-current operation is stopped in a step S133, and the charge holding mode "b" is executed in a step S134. Thereafter, the controller 21 executes the step S116 and following steps again.

If the hydrogen gas concentration is lower than the predetermined concentration in the step S132, then the controller 21 determines whether or not a voltage across the storage battery 22 is equal to or higher than a voltage Vb2 (=17 V×N (the number of series-connected cells of the storage battery 22)) for finishing the charging of the storage battery 22 in a step S135. If the voltage across the storage battery 22 is lower than the voltage Vb2, then the controller 21 determines whether the preset time measured by the charging timer is up or not in a step S136.

If the preset time measured by the charging timer is not up, then the controller 21 executes the step S125 and following steps again. In this case, the charging timer has been set to 4 hours in the step S115. If the preset time measured by the charging timer is up in the step S136, or if the voltage across the storage battery 22 is equal to or higher than the voltage Vb1 in the step S135, then the constant-current operation is stopped in a step S137, and thereafter, control returns to the sequence for boarding waiting.

The subroutine of the sequence for a two-stage charging mode with a constant current at a first stage and a constant voltage at a second stage will be described below with reference to FIGS. 13 through 16.

When the control enters the subroutine of the sequence for a two-stage charging mode with a constant current at a first stage and a constant voltage at a second stage, the controller 21 determines whether the main switches 13, 14 are turned off or not in a step S141. If the main switches 13, 14 are turned off, then the sequence for the two-stage charging mode is ended. If the main switches 13, 14 are turned on, then the controller 21 determines whether the charging stop command key switch 52 is turned on or not in a step S142. If the charging stop command key switch 52 is turned on, then control returns to the sequence for boarding waiting.

If the charging stop command key switch 52 is not turned on, then the controller 21 determines whether the power supply plug 11 is inserted in its corresponding power supply outlet or not in a step S143. If inserted, i.e., if the voltage of 200 V is supplied, then the controller 21 is initialized in a step S144. Specifically, in the step S144, a charging current Ib1 at a first stage is set to Ib1=0.2(C/H), a voltage Vb1 across the storage battery 22 for transition to charging at a second stage is set to Vb1=14.5 V×N (the number of series-connected cells of the storage battery 22), and a charging timer is set to 4 hours.

If the power supply plug 11 is not inserted in the corresponding power supply outlet in the step S143, then the controller 21 determines whether the power supply plug 12 is inserted in its corresponding power supply outlet or not in a step S145. If the power supply plug 12 is not inserted in its corresponding power supply outlet, then a message indicating that no power supply is connected is displayed on the display unit 55 in a step S146. Thereafter, the controller 21 executes the step S141 and following steps again.

If the power supply plug 12 is inserted in its corresponding power supply outlet, i.e., if only the voltage of 100 V is supplied, then the controller 21 is initialized in a step S147. Specifically, in the step S147, a charging current Ib1 at a first stage is set to Ib1=0.05(C/H), a voltage Vb1 across the storage battery 22 for transition to charging at a second stage is set to Vb1=14.5 V×N (the number of series-connected cells of the storage battery 22), and a charging timer is set to 16 hours.

After the steps S144, S147, the controller 21 determines whether or not the temperature inside the storage battery 22, as detected by the temperature detector 26, is equal to or higher than a predetermined temperature or not in a step S148. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S149. If the temperature is equal to or higher than the predetermined temperature in the step S148 or if the hydrogen gas concentration is equal to or higher than the predetermined concentration in the step S149, then the controller 21 executes the charge holding mode "b" in a step S150. Thereafter, the controller 21 executes the step S141 and following steps again.

If the hydrogen gas concentration is lower than the predetermined concentration in the step S149, then the voltage detector 24 detects a voltage across the storage battery 22 and the current detector 23 detects a current flowing to or from the storage battery 22 in a step S151. Thereafter, the thyristor bridge 20 is controlled by the phase control circuit 19 to output a constant current Ib1 of 0.2(C/H) at a first stage when the voltage of 200 V is supplied, or to output a constant current Ib1 of 0.05(C/H) at a first stage when only the voltage of 100 V is supplied, and the charging timer starts measuring time in a step S152.

After the step S152, the controller 21 determines whether the main switches 13, 14 are turned off or not in a step S153. If the main switches 13, 14 are turned off, then the constant-current operation to output the constant current from the thyristor bridge 20 is stopped in a step S154. If the main switches 13, 14 are not turned off, then the controller 21 determines whether the charging stop command key switch 52 is turned on or not in a step S155. If the charging stop command key switch 52 is turned on, then the constant-current operation is stopped in a step S156. Thereafter, control returns to the sequence for boarding waiting.

If the charging stop command key switch 52 is not turned on in the step S155, then the controller 21 determines whether the power supply plugs 11, 12 are inserted in their corresponding power supply outlets or not in a step S157. If not inserted, then the constant-current operation is stopped in a step S158, and the controller 21 executes the step S141 and following steps again.

If the power supply plug 11 or 12 is inserted in its corresponding power supply outlets in the step S157, then the controller 21 determines whether or not the temperature inside the storage battery 22, as detected by the temperature detector 26, is equal to or higher than a predetermined temperature in a step S159. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S160. If the temperature is equal to or higher than the predetermined temperature in the step S159 or if the hydrogen gas concentration is equal to or higher than the predetermined concentration in the step S160, then the constant-current operation is stopped in a step S161, and the charge holding mode "b" is executed in a step S162. Thereafter, the controller 21 executes the step S141 and following steps again.

If the hydrogen gas concentration is lower than the predetermined concentration in the step S160, then the controller 21 determines whether or not a voltage across the storage battery 22 is equal to or higher than a voltage Vb1 (=14.5 V×N (the number of series-connected cells of the storage battery 22)) for transition to the second stage in a step S163. If the voltage across the storage battery 22 is lower than the voltage Vb1, then the controller 21 determines whether the preset time measured by the charging timer is up or not in a step S164.

If the preset time measured by the charging timer is not up, then the controller 21 executes the step S153 and following steps again. If the constant current is set to 0.2(C/H) in the step S152, then the controller 21 determines whether 4 hours have elapsed or not in the step S164. If the constant current is set to 0.05(C/H) in the step S152, then the controller 21 determines whether 16 hours have elapsed or not in the step S164.

If the time measured by the charging timer is up in the step S164 or if the voltage across the storage battery 22 is equal to or higher than the voltage Vb1 in the step S163, then the constant-current operation is stopped in a step S165, and thereafter the controller 21 sets a voltage control value Vb2 at the second stage to Vb2=14.5 V×N (the number of series-connected cells of the storage battery 22), sets a charging end current Ib2 to Ib2=0.01(C/H), and also sets the time to be measured by the charging timer to 4 hours in a step S170.

After the step S170, the controller 21 determines whether the main switches 13, 14 are turned off or not in a step S171. If the main switches 13, 14 are turned off, then the charging mode is ended. If the main switches 13, 14 are not turned off, then the controller 21 determines whether the charging stop command key switch 52 is turned on or not in a step S172. If the charging stop command key switch 52 is turned on, then control returns to the sequence for boarding waiting.

If the charging stop command key switch 52 is not turned on in the step S172, then the controller 21 determines whether the power supply plugs 11, 12 are inserted in their corresponding power supply outlets or not in a step S173. If not inserted, then a message indicating that no power supply is connected is displayed on the display unit 55 in a step S174. Thereafter, the controller 21 executes the step S171 and following steps again.

If the power supply plug 11 or 12 is inserted in its corresponding power supply outlet in the step S173, then the controller 21 determines whether or not the temperature inside the storage battery 22, as detected by the temperature detector 26, is equal to or higher than a predetermined temperature in a step S175. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S176. If the temperature is equal to or higher than the predetermined temperature in the step S175 or if the hydrogen gas concentration is equal to or higher than the predetermined concentration in the step S176, then the charge holding mode "b" is executed in a step S177. Thereafter, the controller 21 executes the step S171 and following steps again.

If the hydrogen gas concentration is lower than the predetermined concentration in the step S176, then the voltage detector 24 detects a voltage across the storage battery 22 and the current detector 23 detects a current flowing to or from the storage battery 22 in a step S178. Thereafter, the thyristor bridge 20 is controlled by the phase control circuit 19 to output a constant voltage Vb2=14.5 V×N (the number of series-connected cells of the storage battery 22) at the second stage, and the charging timer starts measuring time in a step S179.

After the step S179, the controller 21 determines whether the main switches 13, 14 are turned off or not in a step S180. If the main switches 13, 14 are turned off, then the constant-voltage operation is stopped in a step S181, whereupon the charging of the storage battery 22 is finished. If the main switches 13, 14 are not turned off, then the controller 21 determines whether the charging stop command key switch 52 is turned on or not in a step S182. If the charging stop command key switch 52 is turned on, then the constant-voltage operation is stopped in a step S183. Thereafter, control returns to the sequence for boarding waiting.

If the charging stop command key switch 52 is not turned on in the step S182, then the controller 21 determines whether the power supply plugs 11, 12 are inserted in their corresponding power supply outlets or not in a step S184. If not inserted, then the constant-current operation is stopped in a step S185, and the controller 21 executes the step S171 and following steps again.

If the power supply plug 11 or 12 is inserted in its corresponding power supply outlets in the step S184, then the controller 21 determines whether or not the temperature inside the storage battery 22, as detected by the temperature detector 26, is equal to or higher than a predetermined temperature in a step S186. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S187. If the temperature is equal to or higher than the predetermined temperature in the step S186 or if the hydrogen gas concentration is equal to or higher than the predetermined concentration in the step S187, then the constant-voltage operation is stopped in a step S188, and the charge holding mode "b" is executed in a step S189. Thereafter, the controller 21 executes the step S171 and following steps again.

If the hydrogen gas concentration is lower than the predetermined concentration in the step S187, then the controller 21 determines whether or not a charging current for the storage battery 22 is equal to or less than a charging end current in a step S190. If the charging current for the storage battery 22 is higher (i.e. "NO.") than the charging end current, then the controller 21 determines whether the preset time measured by the charging timer is up or not in a step S191.

If the charging current for the storage battery 22 is equal to or less than the charging end current in the step S190, or if the preset time measured by the charging timer is up in the step S191, then the constant-voltage operation is stopped in a step S192, and thereafter, control returns to the sequence for boarding waiting.

When the charging of the storage battery 22 is finished, the sequence for boarding waiting is executed until the time when passengers enter the electric vehicle. A subroutine of the sequence for boarding waiting in the operation of the apparatus shown in FIG. 1 will be described below with reference to FIGS. 17 and 18.

When the control enters the subroutine of the sequence for boarding waiting, the controller 21 determines whether the main switches 13, 14 are turned off or not in a step S200. If the main switches 13, 14 are turned off, then the sequence for boarding waiting is ended. If the main switches 13, 14 are turned on, then the controller 21 determines whether the power supply plugs 11, 12 are inserted in their corresponding power supply outlets or not in a step S201. If not inserted, then the controller 21 executes the step S200 and following steps again. If the power supply plugs 11, 12 are inserted in their corresponding power supply outlets, then the voltage detector 24 detects a voltage across the storage battery 22 and the current detector 23 detects a current flowing to or from the storage battery 22 in a step S202.

After the step S202, the controller 21 determines whether the air-conditioning unit 30 issues an operation request or not by ascertaining if the switch 31 is turned on or not in a step S203. If the air-conditioning unit 30 does not issue an operation request, then the controller 21 determines whether a discharged current is flowing from the storage battery 22 or not in a step S204. If no discharged current is flowing from the storage battery 22, then the controller 21 executes the step S200 and following steps again.

If the air-conditioning unit 30 issues an operation request in the step S203 or if a discharged current is flowing from the storage battery 22 in the step S204, then the controller 21 controls the phase control circuit 19 to equalize an output voltage Vc from the thyristor bridge 20 to (the voltage across the storage battery 22–$\alpha$) in a step S205. Specifically, the controller 21 determines that a discharged current is flowing from the storage battery 22 when any one of the accessories 40 is in operation. The output voltage Vc from the thyristor bridge 20 is established to minimize an adjustment step range $\alpha$ with reference to the voltage across the storage battery 22. The range in which the current flowing to and from the storage battery 22 is detected in the step S202 and the adjustment step range $\alpha$ are determined depending on the characteristics of the storage battery 22 and the charger 2 as with the charge holding mode "a".

After the step S205, the thyristor bridge 20 is controlled by the phase control circuit 19 to start producing the output voltage Vc at the constant voltage level in a step S206. Then, the controller 21 determines whether the main switches 13, 14 are turned off or not in a step S207. If the main switches 13, 14 are turned off, then the constant-voltage operation is stopped, and the sequence for boarding waiting is ended in a step S208. If the main switches 13, 14 are turned on in the step S207, then the controller 21 determines whether the power supply plugs 11, 12 are inserted in their corresponding power supply outlets or not in a step S209. If not inserted, then the constant-voltage operation is stopped in a step S213, and the controller 21 executes the step S200 and following steps again.

If the power supply plugs 11, 12 are inserted in their corresponding power supply outlets, then the voltage detector 24 detects a voltage across the storage battery 22 and the current detector 23 detects a current flowing to or from the storage battery 22 in a step S210, and then the controller 21 determines whether the air-conditioning unit 30 issues an operation request or not by ascertaining if the switch 31 is turned on or not in a step S211. If the air-conditioning unit 30 does not issue an operation request, then the controller 21 determines whether a discharged current is flowing from the storage battery 22 or not in a step S212. If no discharged current is flowing from the storage battery 22, then the constant-voltage operation is stopped in step S213 and the controller 21 executes the step S200 and following steps again.

If the air-conditioning unit 30 issues an operation request in the step S211 or if a discharged current is flowing from the storage battery 22 in the step S212, then the controller 21 determines whether a current Ib flowing from the storage battery 22 is in a range of Ib>0.02(C/H), or 0.02(C/H)$\geq$Ib$\geq$–0.02(C/H), or Ib<–0.02(C/H) in a step S214.

If the current Ib flowing from the storage battery 22 is in the range of Ib>0.02(C/H), then the storage battery 22 is being discharged, and the controller 21 controls the phase control circuit 19 to set the output voltage Vc from the thyristor bridge 20 to a voltage (Vc+$\alpha$) in a step S215, after which control returns to the step S207. Therefore, each time the step S215 is executed, the output voltage from the thyristor bridge 20 is incremented by $\alpha$.

If the current Ib flowing from the storage battery 22 is in the range of 0.02(C/H)$\geq$Ib$\geq$–0.02(C/H) in the step S214, then the controller 21 controls the phase control circuit 19 to set the output voltage Vc from the thyristor bridge 20 to the voltage Vc in a step S216, after which control returns to the step S207. In this case, the storage battery 22 is neither being discharged nor charged, and the output voltage Vc from the thyristor 20 is maintained.

If the current Ib flowing from the storage battery 22 is in the range of Ib<–0.02(C/H) in the step S214, then the storage battery 22 is being charged, and the controller 21 controls the phase control circuit 19 to set the output voltage Vc from the thyristor bridge 20 to a voltage (Vc–$\alpha$) in a step S217, after which control returns to the step S207. Therefore, each time the step S217 is executed, the output voltage from the thyristor bridge 20 is incremented by (−α).

Therefore, when the air-conditioning unit 30 is actuated or any one of the accessories 40 is actuated after the charging of the storage battery 22 is finished, the steps S214, S215 are executed to supply electric currents from the thyristor bridge 20 to the air-conditioning unit 30 and the accessories 40, and the currents charged to and discharged from the storage battery 22 are held to a minimum. When the air-conditioning unit 30 is actuated and/or any one of the accessories 40 is actuated before boarding and after the charging of the storage battery 22 is finished, they are energized by the charger 2, but are prevented from being energized by the storage battery 22.

When the current Ib flowing from the storage battery 22 is in the range of Ib<−0.02(C/H) in the sequence for boarding waiting, the steps S214, S127 are executed to prevent the storage battery 22 from being overcharged by the charger 2.

Figure 19:
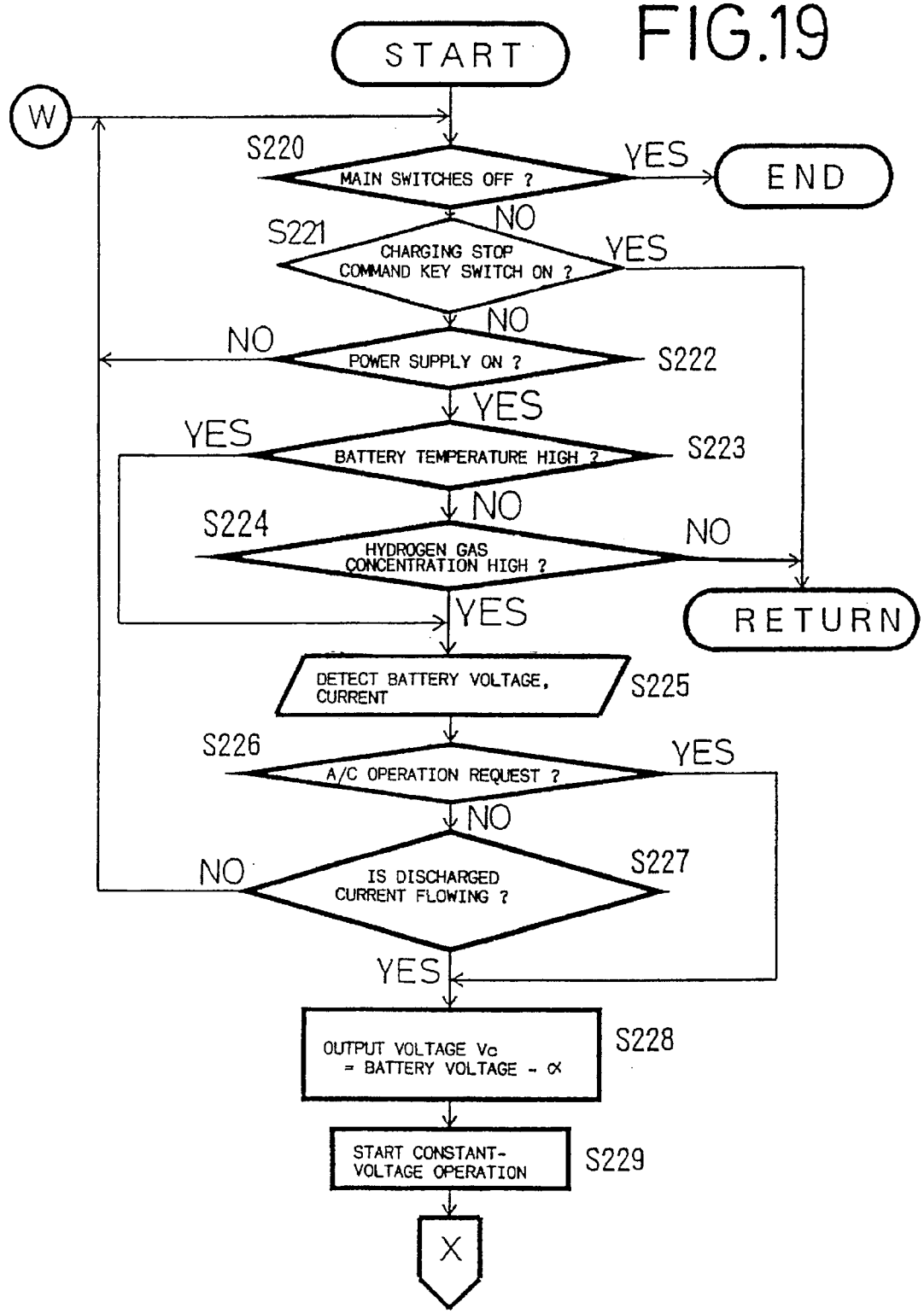

The charge holding mode "b" will be described below with reference to FIGS. 19 and 20.

When the control enters the charge holding mode "b", the controller 21 determines whether the main switches 13, 14 are turned off or not in a step S220. If the main switches 13, 14 are turned off, then the charge holding mode "b" is ended. If the main switches 13, 14 are not turned off, then the controller 21 determines whether the charging stop command key switch 52 is turned on or not in a step S221. If the charging stop command key switch 52 is turned on, then control returns to the main routine. If the charging stop command key switch 52 is not turned on, then the controller 21 determines whether the power supply plugs 11, 12 are inserted in their corresponding power supply outlets or not in a step S222. If not inserted, then the controller 21 executes the step S220 and following steps again.

If the power supply plugs 11, 12 are inserted in their corresponding power supply outlets in the step S222, then the controller 21 determines whether or not the temperature inside the storage battery 22, as detected by the temperature detector 26, is equal to or higher than a predetermined temperature in a step S223. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S224. If the hydrogen gas concentration is lower than the predetermined concentration in the step S187, then control returns to the main routine. Therefore, control goes back to the charging mode if the temperature inside the storage battery 22 is lower than the predetermined temperature, and if the hydrogen gas concentration is lower than the predetermined concentration.

If the temperature is equal to or higher than the predetermined temperature in the step S223 or if the hydrogen gas concentration is equal to or higher than the predetermined concentration in the step S224, then the voltage detector 24 detects a voltage across the storage battery 22 and the current detector 23 detects a current flowing to or from the storage battery 22 in a step S225.

After the step S225, the controller 21 determines whether the air-conditioning unit 30 issues an operation request or not in a step S226. If the air-conditioning unit 30 does not issue an operation request, then the controller 21 determines whether a discharged current is flowing from the storage battery 22 or not in a step S227. If no discharged current is flowing from the storage battery 22, then the controller 21 executes the step S220 and following steps again.

If the air-conditioning unit 30 issues an operation request in the step S226 or if a discharged current is flowing from the storage battery 22 in the step S227, then the controller 21 controls the phase control circuit 19 to equalize an output voltage Vc from the thyristor bridge 20 to (the voltage across the storage battery 22−α) in a step S228. Specifically, the controller 21 determines that a discharged current is flowing from the storage battery 22 when any one of the accessories 40 is in operation. When the charger 2 operates under a constant voltage, the output voltage Vc from the thyristor bridge 20 is set to a constant voltage level that is slightly lower than the voltage across the storage battery 22 by an adjustment step range α. The range in which the current of the storage battery 22 is detected in the step S225 and the adjustment step range α are determined depending on the characteristics of the storage battery 22 and the charger 2 so as to minimize the current flowing to and from the storage battery 22.

After the step S228, the thyristor bridge 20 is controlled by the phase control circuit 19 to start producing the output voltage Vc at the constant voltage level in a step S229. Then, the controller 21 determines whether the main switches 13, 14 are turned off or not in a step S230. If the main switches 13, 14 are turned off, then the constant-voltage operation is stopped, and the charge holding mode "b" is ended in a step S231. If the main switch 13 or 14 is turned on in the step S230, then the controller 21 determines whether the charging stop command key switch 52 is turned on or not in a step S232. If the charging stop command key switch 52 is turned on, then the constant-voltage operation is stopped in a step S237, and control returns to the main routine.

If the charging stop command key switch 52 is not turned on, then the controller 21 determines whether the power supply plugs 11, 12 are inserted in their corresponding power supply outlets or not, i.e., whether the power supplies are turned on, in a step S233. If not inserted, then the constant-voltage operation is stopped in a step S234, the controller 21 executes the step S220 and following steps again.

If the power supply plugs 11, 12 are inserted in their corresponding power supply outlets, i.e., if the power supplies are turned on, in the step S233, then the controller 21 determines whether or not the temperature inside the storage battery 22, as detected by the temperature detector 26, is equal to or higher than a predetermined temperature in a step S235. If the temperature is lower than the predetermined temperature, then the controller 21 determines whether or not the concentration of a hydrogen gas generated by the storage battery 22, as detected by the hydrogen concentration detector 25, is equal to or higher than a predetermined concentration in a step S236. If the hydrogen gas concentration is lower than the predetermined concentration in the step S236, then the constant-voltage operation is stopped in a step S237, and control returns to the main routine. Therefore, control goes back to the charging mode if the temperature inside the storage battery 22 is lower than the predetermined temperature, and if the hydrogen gas concentration is lower than the predetermined concentration.

If the temperature is equal to or higher than the predetermined temperature in the step S235 or if the hydrogen gas concentration is equal to or higher than the predetermined concentration in the step S236, then the voltage detector 24 detects a voltage across the storage battery 22 and the current detector 23 detects a current flowing to or from the storage battery 22 in a step S238. Thereafter, the controller 21 determines whether the air-conditioning unit 30 issues an operation request or not in a step S239. If the air-conditioning unit 30 does not issue an operation request, then the controller 21 determines whether a discharged current is flowing from the storage battery 22 or not in a step S240. If no discharged current is flowing from the storage battery 22, then the constant-voltage operation is stopped in a step S241, and the controller 21 executes the step S220 and following steps again.

If the air-conditioning unit 30 issues an operation request in the step S239 or if a discharged current is flowing from the storage battery 22 in the step S240, then the controller 21 determines whether a current Ib flowing from the storage battery 22 is in a range of Ib>0.02(C/H), or 0.02(C/H) $\geq$Ib$\geq$−0.02(C/H), or Ib<0.02(C/H) in a step S242.

If the current Ib flowing from the storage battery 22 is in the range of Ib>0.02(C/H), then the storage battery 22 is being discharged, and the controller 21 controls the phase control circuit 19 to set the output voltage Vc from the thyristor bridge 20 to a voltage (Vc+$\alpha$) in a step S243, after which the controller 21 executes the step S230. Therefore, each time the step S243 is executed, the output voltage from the thyristor bridge 20 is incremented by $\alpha$.

If the current Ib flowing from the storage battery 22 is in the range of 0.02(C/H)$\geq$Ib$\geq$−0.02(C/H) in the step S214, then the controller 21 controls the phase control circuit 19 to set the output voltage Vc from the thyristor bridge 20 to the voltage Vc in a step S244, after which the controller 21 executes the step S230. In this case, the storage battery 22 is neither being discharged nor charged, and the output voltage Vc from the thyristor 20 is maintained.

If the current Ib flowing from the storage battery 22 is in the range of Ib<−0.02(C/H) in the step S242, then the storage battery 22 is being charged, and the controller 21 controls the phase control circuit 19 to set the output voltage Vc from the thyristor bridge 20 to a voltage (Vc−$\alpha$) in a step S245, after which the controller 21 executes the step S230. Therefore, each time the step S245 is executed, the output voltage from the thyristor bridge 20 is incremented by (−$\alpha$).

Therefore, in the charge holding mode "b", control waits until the hydrogen gas concentration detected by the hydrogen concentration detector 25 becomes lower than the predetermined concentration and the temperature detected by the temperature detector 26 becomes lower than the predetermined temperature, and then returns to the main routine. When the air-conditioning unit 30 is actuated or any one of the accessories 40 is actuated in the charge holding mode "b", the steps S242, S243 are executed to supply electric current from the thyristor bridge 20, but not from the storage battery 22, to the air-conditioning unit 30 and the accessories 40. When the current Ib flowing from the storage battery 22 is in the range of Ib<0.02(C/H) in the charge holding mode "b", the steps S242, S245 are executed to prevent the storage battery 22 from being charged by the charger 2.

With the apparatus according to the present invention, as described above, a necessary charging period is calculated on the basis of the amount of electric energy discharged from the storage battery at the time the apparatus is instructed to charge the battery, the voltage of the power supply connected to the charger, and a predetermined charging current, and a charging start time for finishing the charging of the storage battery at a scheduled boarding time from the calculated necessary charging period and the scheduled boarding time, and the storage battery starts being charged with the predetermined charging current at the calculated charging start time. Alternatively, a necessary charging period is read from the memory means by referring to the amount of electric energy discharged from the storage battery and the voltage of the power supply, and a charging start time for finishing the charging of the storage battery at a scheduled boarding time from that necessary charging period and the scheduled boarding time, and the storage battery starts being charged with a predetermined charging current from the calculated charging start time. Therefore, if the storage battery is connected to the charger for being charged prior to a day on which the electric vehicle is not used, e.g., on a weekend, the period of time during which the storage battery is left to stand may be short, and the amount of electric energy self-discharged from the storage battery will be small in that period of time.

Furthermore, the apparatus according to the present invention is also advantageous in that since the charging of the storage battery is finished at the scheduled boarding time, the period of time for which the storage battery is left to stand after it has been charged will be short, and any reduction in the storage capacity of the storage battery due to a temperature drop in a cold climate will be small.

The apparatus according to the present invention is further advantageous in that with various electric vehicles having different scheduled boarding times, charging periods are prevented from being concentrated in a certain time zone, and hence demands for electric energy are leveled.

Having now fully described the invention, it should be understood that various changes and modifications may be made therein without departing from the scope of the appended claims.

What is claimed is:

1. An apparatus for controlling a charger for charging a storage battery for use on an electric vehicle, comprising, scheduled boarding time indicating means for indicating a scheduled boarding time, charging commanding means for commanding charging of the storage battery, charging period calculating means for calculating a necessary charging period based on an amount of electric energy discharged from the storage battery when charging of the storage battery is commanded and a predetermined charging current, charging start time calculating means for calculating a charging start time to finish the charging of the storage battery at the indicated scheduled boarding time based on said indicated scheduled boarding time and the calculated necessary charging period, and charging starting means for starting the charging of the storage battery with said predetermined charging current the calculated charging start time.

2. An apparatus according to claim 1, wherein said charging start time calculating means comprises calculating means for calculating the charging start time by subtracting the necessary charging period from the scheduled boarding time.

3. An apparatus according to claim 1, wherein said charging period calculating means comprises a determining means for determining which one of a plurality of sections divided from an entire storage capacity of the storage battery the amount of electric energy discharged from the storage battery falls in when the charging of the storage battery is commanded, first calculating means for calculating a necessary charging period required to charge, with a predetermined charging current corresponding to the determined one of the sections, a storage capacity which is represented by the difference between the storage capacity at a lower limit of the determined one of the sections and the amount of electric energy discharged from the storage battery when the charging of the storage battery is commanded, second calculating means for calculating a total of necessary charging periods required to charge, with charging currents corresponding to respective sections of the entire storage capacity, the sections of the entire storage capacity which are smaller than said lower limit of the determined one of the sections, and third calculating means for calculating the sum of the charging periods calculated by said first calculating means and said second calculating means and using the calculated sum of the charging periods as a necessary charging period with respect to the amount of electric energy discharged from the storage battery when the charging of the storage battery is commanded.

4. An apparatus according to claim 1, wherein said charging period calculating means comprises first determining means for determining whether the amount of electric energy discharged from the storage battery when the charging of the storage battery is commanded exceeds a predetermined amount of discharged electric energy, first calculating means for calculating a first charging period required to charge, with a predetermined first charging current, an amount of discharged electric energy in excess of said predetermined amount of discharged electric energy when the amount of electric energy discharged from the storage battery is determined as exceeding said predetermined amount of discharged electric energy by said first determining means, second calculating means for calculating a second charging period required to charge said predetermined amount of discharged electric energy with a predetermined second charging current, third calculating means for calculating a third charging period by adding said first charging period and said second charging period, fourth calculating means for calculating a period in which a period from a time when the scheduled boarding time is entered to said scheduled boarding time falls in each of at least two time zones that are divided from one day in order to determine a time zone in which to use electric energy, and second determining means for determining whether said third charging period falls in one of said time zones which consumes a minimum amount of electric energy supplied from an electric energy supply system, the arrangement being such that said third charging period is regarded as a necessary charging period when said third charging period is determined by said second determining means as falling in said one of said time zones which consumes a minimum amount of electric energy supplied from said electric energy supply system.

5. An apparatus according to claim 1, wherein said charging period calculating means comprises first determining means for determining whether the amount of electric energy discharged from the storage battery when the charging of the storage battery is commanded exceeds a predetermined amount of discharged electric energy, first calculating means for calculating a first charging period required to charge, with a predetermined first charging current, an amount of discharged electric energy in excess of said predetermined amount of discharged electric energy when the amount of electric energy discharged from the storage battery is determined as exceeding said predetermined amount of discharged electric energy by said first determining means, second calculating means for calculating a period in which a period from a time when the scheduled boarding time is entered to said scheduled boarding time falls in each of at least two time zones that are divided from one day in order to determine a time zone in which to use electric energy, third calculating means for regarding the period of one of said time zones which consumes a minimum amount of electric energy supplied from an electric energy supply system as a second charging period, when said first charging period exceeds the period of said one of said time zones which consumes a minimum amount of electric energy supplied from said electric energy supply system, and subtracting an amount of electric energy charged with said first charging current for said second charging period from the amount of electric energy discharged from the storage battery when the charging of the storage battery is commanded, and calculating a third charging period required to charge an amount of discharged electric energy as a result of subtraction with a second charging current, fourth calculating means for adding said second charging period and said third charging period, and second determining means for determining whether said third charging period falls in a time zone which consumes a second smallest amount of electric energy next to said one of said time zones which consumes a minimum amount of electric energy supplied from said electric energy supply system, the arrangement being such that the sum of the second and third charging periods calculated by said fourth calculating means is regarded as a necessary charging period when said third charging period is determined by said second determining means as falling in the time zone which consumes a second smallest amount of electric energy next to said one of said time zones which consumes a minimum amount of electric energy supplied from said electric energy supply system.

6. An apparatus according to claim 1, wherein said charging period calculating means comprises first determining means for determining whether the amount of electric energy discharged from the storage battery when the charging of the storage battery is commanded exceeds a predetermined amount of discharged electric energy, first calculating means for calculating a first charging period required to charge, with a predetermined first charging current, an amount of discharged electric energy in excess of said predetermined amount of discharged electric energy when the amount of electric energy discharged from the storage battery is determined as exceeding said predetermined amount of discharged electric energy by said first determining means, second calculating means for calculating a second charging period required to charge said predetermined amount of discharged electric energy with a predetermined second charging current, third calculating means for calculating a third charging period by adding said first charging period and said second charging period, fourth calculating means for calculating a period in which a period from a time when the scheduled boarding time is entered to said scheduled boarding time falls in each of at least two time zones that are divided from one day in order to determine a time zone in which to use electric energy, fifth calculating means for calculating a fourth charging period by subtracting said first charging period from the period of one of said time zones which consumes a minimum amount of electric energy supplied from an electric energy supply system and calculating a fifth charging period by subtracting said fourth charging period from said second charging period when said third charging period exceeds the period of said one of said time zones which consumes a minimum amount of electric energy supplied from said electric energy supply system and also when said first charging period falls in said one of said time zones which consumes a minimum amount of electric energy supplied from said electric energy supply system, sixth calculating means for adding said first charging period, said fourth charging period and said fifth charging period, and second determining means for determining that said fifth charging period falls in a time zone which consumes a second smallest amount of electric energy next to said one of said time zones which consumes a minimum amount of electric energy supplied from said electric energy supply system, the arrangement being such that the sum of the first, fourth and fifth charging periods calculated by said sixth calculating means is regarded as a necessary charging period when said fifth charging period is determine by said second determining means as falling in the time zone which consumes a second smallest amount of electric energy next to said one of said time zones which consumes a minimum amount of electric energy supplied from said electric energy supply system.

7. An apparatus according to claim 1, wherein said charging period calculating means comprises first determining means for determining whether or not the amount of electric energy discharged from the storage battery when the charging of the storage battery is commanded is equal to or lower than a predetermined amount of discharged electric energy, first calculating means for calculating a charging period required to charge, with a predetermined charging current, the amount of electric energy discharged from the storage battery when the charging of the storage battery is commanded when the amount of electric energy discharged from the storage battery is determined by said first determining means as equal to or lower than said predetermined amount of discharged electric energy, second calculating means for calculating a period in which a period from a time when the scheduled boarding time is entered to said scheduled boarding time falls in each of at least two time zones that are divided from one day in order to determine a time zone in which to use electric energy, and second determining means for determining whether said charging period falls in one of said time zones which consumes a minimum amount of electric energy supplied from an electric energy supply system, the arrangement being such that said charging period is regarded as a necessary charging period when said charging period is determined by said second determining means as falling in said one of said time zones which consumes a minimum amount of electric energy supplied from said electric energy supply system.

8. An apparatus according to claim 1, wherein said charging period calculating means comprises first determining means for determining whether or not the amount of electric energy discharged from the storage battery when the charging of the storage battery is commanded is equal to or lower than a predetermined amount of discharged electric energy, first calculating means for calculating a first charging period required to charge, with a predetermined charging current, the amount of electric energy discharged from the storage battery when the charging of the storage battery is commanded when the amount of electric energy discharged from the storage battery is determined by said first determining means as equal to or lower than said predetermined amount of discharged electric energy, second calculating means for calculating a period in which a period from a time when the scheduled boarding time is entered to said scheduled boarding time falls in each of at least two time zones that are divided from one day in order to determine a time zone in which to use electric energy, second determining means for determining whether said first charging period falls in one of said time zones which consumes a minimum amount of electric energy supplied from an electric energy supply system, third calculating means for calculating a second charging period by subtracting the period of said one of said time zones which consumes a minimum amount of electric energy supplied from said electric energy supply system from said first charging period when said first charging period is determined by said second determining means as not falling in said one of said time zones which consumes a minimum amount of electric energy supplied from said electric energy supply system, and third determining means for determining that said second charging period falls in the period of a time zone which consumes a second smallest amount of electric energy next to said one of said time zones which consumes a minimum amount of electric energy supplied from said electric energy supply system, the arrangement being such that said second charging period is regarded as a necessary charging period when said second charging period is determined by said third determining means as falling in the time zone which consumes a second smallest amount of electric energy next to said one of said time zones which consumes a minimum amount of electric energy supplied from said electric energy supply system.

9. An apparatus for controlling a charger for charging a storage battery for use on an electric vehicle, comprising scheduled boarding time indicating means for indicating a scheduled boarding time, charging commanding means for commanding charging of the storage battery, memory means for storing a charging period based on an amount of electric energy discharged from the storage battery and a voltage of a power supply supplied to the charger, charging period calculating means for calculating a necessary charging period based on a charging period read from said memory means by referring to the amount of electric energy discharged from the storage battery and the voltage of the power supply supplied to the charger, charging start time calculating means for calculating a charging start time to finish the charging of the storage battery at the indicated scheduled boarding time based on said indicated scheduled boarding time and the calculated necessary charging period, and charging starting means for starting the charging of the storage battery with a predetermined charging current based on the voltage of the power supply at the calculated charging start time.

10. An apparatus according to claim 9, wherein said charging period calculating means comprises a calculating means for calculating a period in which a period from a time when the scheduled boarding time is entered to said scheduled boarding time falls in each of at least two time zones that are divided from one day in order to determine a time zone in which to use electric energy, a reading means for reading a charging period from said memory means by referring to the voltage of the power supply and the amount of discharged electric energy when the charger is supplied with electric energy from the power supply in one of the time zones which consumes a minimum amount of electric energy supplied from an electric energy supply system, and a determining means for determining whether said charging period falls in the period of said one of the time zones which consumes a minimum amount of electric energy supplied from an electric energy supply system, the arrangement being such that said charging period is regarded as a necessary charging period when said charging period is determined by said determining means as falling in the period of said one of the time zones which consumes a minimum amount of electric energy supplied from an electric energy supply system.

11. An apparatus according to claim 9, wherein said charging period calculating means comprises a first calculating means for calculating a period in which a period from a time when the scheduled boarding time is entered to said scheduled boarding time falls in each of at least two time zones that are divided from one day in order to determine a time zone in which to use electric energy, first reading means for reading a first charging period from said memory means by referring to the voltage of the power supply and the amount of discharged electric energy when the charger is supplied with electric energy from the power supply in one of the time zones which consumes a minimum amount of electric energy supplied from an electric energy supply system, a first determining means for determining whether said first charging period falls in the period of said one of the time zones which consumes a minimum amount of electric energy supplied from an electric energy supply system, remaining-discharged-amount calculating means for calculating, based on data in said memory means when read by said first reading means, a remaining amount of discharged electric energy when the storage battery is charged based on the voltage when read by said first reading means in said one of the time zones which consumes a minimum amount of electric energy supplied from an electric energy supply system when said first charging period is determined by said first determining means as not falling in the period of said one of the time zones which consumes a minimum amount of electric energy supplied from an electric energy supply system, second reading means for reading a second charging period from said memory means by referring to the voltage of the power supply and the amount of discharged electric energy when the charger is supplied with electric energy from the power supply in a time zone which consumes a second smallest amount of electric energy next to said one of said time zones which consumes a minimum amount of electric energy supplied from said electric energy supply system, a second determining means for determining whether said second charging period falls in the period of the time zone which consumes a second smallest amount of electric energy next to said one of said time zones which consumes a minimum amount of electric energy supplied from said electric energy supply system, and a second calculating means for adding said first charging period and said second charging period, the arrangement being such that the sum of the first and second charging periods calculated by said second calculating means is regarded as a necessary charging period when said second charging period is determined by said second determining means as falling in the period of the time zone which consumes a second smallest amount of electric energy next to said one of said time zones which consumes a minimum amount of electric energy supplied from said electric energy supply system.

12. An apparatus for controlling a charger for charging a storage battery on an electric vehicle, comprising, scheduled boarding time indicating means for a vehicle user to indicate a scheduled boarding time, charging commanding means for commanding charging of the storage battery, means for measuring an amount of electric energy discharged from the storage battery, charging period calculating means for calculating a necessary charging period based on said amount of electric energy discharged from the storage battery when charging of the storage battery is commanded by said charging commanding means, charging start time calculating means for calculating a charging start time for finishing the charging of the storage battery at the indicated scheduled boarding time, and means for starting the charging of the storage battery at the calculated charging start time.

13. An apparatus according to claim 12, wherein said charging start time calculating means includes means for calculating the charging start time by subtracting the necessary charging period from the scheduled boarding time.

14. An apparatus according to claim 12, further comprising, memory means for storing a time period of reduced cost of electric energy, and said charging start time calculating means including means for reading said memory means and calculating charging start time based, at least in part, on said reduced cost time period.

15. An apparatus according to claim 12, further comprising, memory means for storing time periods of available high and low voltage electric energy for charging the storage battery, and said charging start time calculating means including means for reading said memory means and calculating said charging start time based, at least in part, on said available high and low voltage time periods.

* * * * *